US011540228B2

(12) United States Patent
Abotabl et al.

(10) Patent No.: US 11,540,228 B2
(45) Date of Patent: Dec. 27, 2022

(54) POWER CONTROL IN SERVING CELL WITH NEIGHBORING CELLS OPERATING IN DIFFERENT DIRECTION OR FULL-DUPLEX MODE

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US); Wanshi Chen, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/330,712

(22) Filed: May 26, 2021

(65) Prior Publication Data

US 2022/0386242 A1    Dec. 1, 2022

(51) Int. Cl.
*H04W 52/18*    (2009.01)
*H04W 52/14*    (2009.01)
(Continued)

(52) U.S. Cl.
CPC ..... *H04W 52/146* (2013.01); *H04W 72/1268* (2013.01); *H04W 72/14* (2013.01); *H04W 74/0833* (2013.01)

(58) Field of Classification Search
CPC ............... H04W 52/18; H04W 52/146; H04W 72/1268; H04W 72/14; H04W 74/0833
(Continued)

(56) References Cited

U.S. PATENT DOCUMENTS 7,020,471 B2 * 3/2006 Bing .................... H04B 7/2612
370/347
7,937,110 B2 * 5/2011 Wu ....................... H04W 88/08
455/562.1
(Continued)

FOREIGN PATENT DOCUMENTS

| WO | WO-2009126902 A2 * | 10/2009 | ........... H04L 1/0003 |
| WO | WO-2016122845 A1 | 8/2016 | |
| WO | WO-2019126063 A1 * | 6/2019 | .......... H04J 11/0056 |

OTHER PUBLICATIONS

Guangdong Oppo Mobile Telecom: "Discussion on Power Ramping and Power Control During RA Procedure", 3GPP TSG RAN WG1 NR Ad-Hoc#2, R1-1710137, 3rd Generation Partnership Project, Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 16, 2017, XP051304216, the whole document.

(Continued)

*Primary Examiner* — Hai V Nguyen
(74) *Attorney, Agent, or Firm* — Holland and Hart

(57) ABSTRACT

Methods, systems, and devices for wireless communication are described. A user equipment (UE), operating in a serving cell, may adjust a transmit power of an uplink message when a neighboring cell is operating in an opposite direction (e.g., relative to the direction of communications in the serving cell) within a same or similar frequency band in a same time period. The UE may receive control signaling that indicates a first power control configuration to be used when the neighboring cell is operating in a same direction as the serving cell and a second power control configuration to be used when the neighboring cell is operating in a different direction from the serving cell. The UE may select the appropriate power control configuration based on the communications directions of the serving cell and the neighbor- (Continued)

ing cell and may transmit the uplink message in accordance with the selected power control configuration.

30 Claims, 16 Drawing Sheets

(51) Int. Cl.
  *H04W 74/08* (2009.01)
  *H04W 72/12* (2009.01)
  *H04W 72/14* (2009.01)
(58) Field of Classification Search
  USPC .................................................. 455/522, 69
  See application file for complete search history.

(56) References Cited

U.S. PATENT DOCUMENTS

| | | | | |
|---|---|---|---|---|
| 8,855,064 | B2* | 10/2014 | Malladi | H04W 72/0446 |
| | | | | 370/310 |
| 8,917,673 | B2* | 12/2014 | Kapoor | H04W 48/12 |
| | | | | 370/332 |
| 9,020,556 | B2* | 4/2015 | Haim | H04W 52/365 |
| | | | | 455/67.11 |
| 9,585,103 | B2* | 2/2017 | Chen | H04W 52/16 |
| 10,057,901 | B2* | 8/2018 | Zhang | H04W 72/0453 |
| 10,104,616 | B2* | 10/2018 | Ang | H04W 52/0216 |
| 10,104,655 | B2* | 10/2018 | Zhang | H04L 1/1635 |
| 10,244,442 | B2* | 3/2019 | Kapoor | H04W 48/16 |
| 10,278,207 | B2* | 4/2019 | Lee | H04L 5/0007 |
| 10,383,067 | B2* | 8/2019 | Lin | H04W 52/367 |
| 10,560,955 | B2* | 2/2020 | Shoshan | H04B 7/15542 |
| 10,674,505 | B2* | 6/2020 | Zhang | H04L 1/1812 |
| 10,917,878 | B2* | 2/2021 | Patel | H04W 74/08 |
| 10,993,157 | B2* | 4/2021 | Kapoor | H04W 72/02 |
| 10,993,192 | B2* | 4/2021 | Lin | H04W 52/42 |
| 11,153,880 | B2* | 10/2021 | Yerramalli | H04W 52/346 |
| 11,197,139 | B2* | 12/2021 | Rico Alvarino | H04W 72/044 |
| 11,343,816 | B2* | 5/2022 | Zhang | H04L 1/0003 |
| 11,382,095 | B2* | 7/2022 | Xie | H04W 72/0426 |
| 11,398,144 | B2* | 7/2022 | Shakedd | G06Q 50/265 |
| 2004/0023649 | A1* | 2/2004 | Bing | H04B 7/2612 |
| | | | | 455/422.1 |
| 2007/0177552 | A1* | 8/2007 | Wu | H04W 88/08 |
| | | | | 370/335 |
| 2009/0257408 | A1* | 10/2009 | Zhang | H04W 72/0446 |
| | | | | 370/336 |
| 2009/0307554 | A1* | 12/2009 | Marinier | H04L 1/1812 |
| | | | | 714/748 |
| 2011/0158332 | A1* | 6/2011 | Wu | H04W 88/08 |
| | | | | 375/259 |
| 2012/0178494 | A1* | 7/2012 | Haim | H04W 72/082 |
| | | | | 455/522 |
| 2013/0077514 | A1* | 3/2013 | Dinan | H04W 24/10 |
| | | | | 370/252 |
| 2014/0126530 | A1* | 5/2014 | Siomina | H04W 52/146 |
| | | | | 370/330 |
| 2014/0148179 | A1* | 5/2014 | Das | H04B 1/7107 |
| | | | | 455/452.1 |
| 2015/0215874 | A1* | 7/2015 | Chen | H04W 52/346 |
| | | | | 455/522 |
| 2015/0351116 | A1* | 12/2015 | Shoshan | H04J 4/00 |
| | | | | 370/330 |
| 2016/0007348 | A1* | 1/2016 | Zhang | H04L 1/1621 |
| | | | | 370/336 |
| 2016/0286556 | A1* | 9/2016 | Lo | H04L 5/0007 |
| 2017/0155488 | A1* | 6/2017 | Saxena | H04W 72/0446 |
| 2018/0049206 | A1* | 2/2018 | Yerramalli | H04W 72/0413 |
| 2018/0279358 | A1* | 9/2018 | Babaei | H04W 72/14 |
| 2019/0053231 | A1* | 2/2019 | Zhang | H04L 1/1812 |
| 2019/0182870 | A1* | 6/2019 | Shih | H04W 74/004 |
| 2019/0253986 | A1* | 8/2019 | Jeon | H04B 7/0626 |
| 2019/0327737 | A1* | 10/2019 | Xie | H04W 72/0446 |
| 2019/0335411 | A1* | 10/2019 | Xie | H04W 72/042 |
| 2020/0045730 | A1* | 2/2020 | Babaei | H04W 72/0453 |
| 2020/0252932 | A1* | 8/2020 | Zhang | H04L 1/1812 |
| 2020/0351729 | A1* | 11/2020 | Rastegardoost | H04W 36/0072 |
| 2021/0007150 | A1* | 1/2021 | Shih | H04W 16/32 |
| 2021/0014893 | A1* | 1/2021 | Park | H04L 5/0057 |
| 2021/0029706 | A1* | 1/2021 | Zhou | H04L 1/1819 |
| 2021/0029719 | A1* | 1/2021 | Zhou | H04L 5/0053 |
| 2021/0051653 | A1* | 2/2021 | Park | H04W 72/0413 |
| 2021/0105812 | A1* | 4/2021 | Rastegardoost | H04L 1/08 |
| 2021/0144743 | A1* | 5/2021 | Rastegardoost | H04W 72/1257 |
| 2021/0153040 | A1* | 5/2021 | Zhou | H04W 72/042 |
| 2021/0211940 | A1* | 7/2021 | Berg | H04W 24/02 |
| 2021/0258951 | A1* | 8/2021 | Sakhnini | H04W 56/0015 |
| 2021/0259021 | A1* | 8/2021 | Huang | H04W 76/10 |
| 2021/0320760 | A1* | 10/2021 | Rastegardoost | H04L 5/0055 |
| 2022/0039163 | A1* | 2/2022 | Park | H04L 5/0048 |

OTHER PUBLICATIONS

International Search Report and Written Opinion—PCT/US2022/030762—ISA/EPO—dated Sep. 22, 2022.

Nokia, et al., "CLI Measurements for Dynamic TDD Concepts in NR", 3GPP TSG RAN WG1 Ad-Hoc Meeting 1901, R1-1900836, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, 7 Pages, Jan. 20, 2019, XP051593682, the whole document.

ZTE: "Overview of Duplexing and Interference Management", 3GPP TSG RAN WG1 Meeting#89, R1-1707203-7.1.6 Overview of Duplexing and Interference Mangt, 3GPP, Mobile Competence Centre, 650, Route Des Lucioles, F-06921 Sophia-Antipolis Cedex, F, vol. RAN WG1, No. Hangzhou, May 15, 2017-May 19, 2017, May 14, 2017, XP051272418, 10 Pages, p. 7, paragraph section 3.2.1, 3.2.2, p. 8, paragraph section 3.2.3, p. 9, paragraph section 3.2.5, the whole document.

* cited by examiner

POWER CONTROL IN SERVING CELL WITH NEIGHBORING CELLS OPERATING IN DIFFERENT DIRECTION OR FULL-DUPLEX MODE

FIELD OF TECHNOLOGY

The following relates to wireless communication, including power control in serving cell with neighboring cells operating in different direction or full-duplex mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a serving base station in a serving cell, and UEs in cells that are adjacent to one another (e.g., neighboring cells) may communicate with respective serving base stations. In some examples, the serving cell and a neighboring cell may experience different communication directions in a same frequency band, e.g., for a given one or more slots. For instance, the serving base station may communicate with the UE in the serving cell in uplink in a slot, while a neighboring base station may communicate with a UE in a neighboring cell in downlink in the slot. As the serving cell and the neighboring cell use the same time and frequency resources for the communications in different directions, the UEs and base stations in the respective cells may suffer increased interference, especially when a UE is operating at a cell edge (i.e., close to the neighboring cell).

SUMMARY

The described techniques relate to improved methods, systems, devices, and apparatuses that support power control in serving cell with neighboring cells operating in different direction or full-duplex mode. Generally, the described techniques provide for a user equipment (UE), operating in a serving cell, to adjust a transmit power of an uplink message when a neighboring cell is operating in an opposite direction within a same or similar frequency band in a same time frame, such as a slot. The UE may be configured, by a serving base station in the serving cell, with multiple power control configurations for the UE to select between based on the direction of communications in the neighboring cell relative to directions of communication in the serving cell. For example, a first power control configuration may be used when the neighboring cell is operating in an opposite direction from the serving cell and a second power control configuration may be used when the neighboring cell is operating in a same direction as the serving cell.

Each of the power control configurations may be associated with one or more power control parameters, such as a path-loss exponent, a power offset, a maximum power, or a maximum power reduction, among other examples. The serving base station may indicate the power control configurations and, in some examples, the one or more power control parameters, to the UE via control signaling. The UE may select an appropriate power control configuration to use for transmitting the uplink message. For example, the UE may determine that, for a transmission time interval (TTI), the serving base station is using a TTI format associated with uplink transmissions and the neighboring base station is using a TTI format associated (e.g., at least partially) with downlink transmissions. The UE may select the second power control configuration, as the serving base station and the neighboring base station are operating in opposite directions during the TTI, and may transmit the uplink message in accordance with the second power control configuration.

A method for wireless communication by a UE is described. The method may include receiving control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band, selecting one of the first power control configuration or the second power control configuration based on a first TTI format of the serving base station and a second TTI format of the neighbor station corresponding to a first TTI for transmission of an uplink message, and transmitting the uplink message during the first TTI in accordance with the selected power control configuration.

An apparatus for wireless communication by a UE is described. The apparatus may include a processor, memory coupled with the processor, and instructions stored in the memory. The instructions may be executable by the processor to cause the apparatus to receive control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band, select one of the first power control configuration or the second power control configuration based on a first TTI format of the serving base station and a second TTI format of the neighbor station corresponding to a first TTI for transmission of an uplink message, and transmit the uplink message during the first TTI in accordance with the selected power control configuration.

Another apparatus for wireless communication by a UE is described. The apparatus may include means for receiving control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band, means for selecting one of the first power control configuration or the second power control configuration based on a first TTI format of the serving base station and a second TTI format of the neighbor station corresponding to a first TTI for transmission of an uplink message, and means for transmitting the uplink message during the first TTI in accordance with the selected power control configuration.

A non-transitory computer-readable medium storing code for wireless communication by a UE is described. The code may include instructions executable by a processor to receive control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band, select one of the first power control configuration or the second power control configuration based on a first TTI format of the serving base station and a second TTI format of the neighbor station corresponding to a first TTI for transmission of an uplink message, and transmit the uplink message during the first TTI in accordance with the selected power control configuration.

In some examples of the method, apparatuses, and non-transitory computer-readable medium described herein, receiving the control signaling may include operations, features, means, or instructions for receiving the control signaling indicating the first TTI format, the second TTI format, or both.

Some examples of the method, apparatuses, and non-transitory computer-readable medium described herein may further include operations, features, means, or instructions for receiving a grant scheduling transmission of the uplink message in the first TTI, where the grant indicates one of the first power control configuration or the second power control configuration.

In some examples of the method, apparatuses, and non-transitory computer-readable medium described herein, receiving the grant may include operations, features, means, or instructions for receiving the grant including a transmit power command indicating one of the first power control configuration or the second power control configuration.

In some examples of the method, apparatuses, and non-transitory computer-readable medium described herein, the transmit power command includes one or more bits indicating one of the first power control configuration or the second power control configuration.

In some examples of the method, apparatuses, and non-transitory computer-readable medium described herein, receiving the control signaling may include operations, features, means, or instructions for receiving, from the serving base station, first control signaling indicating the first TTI format and receiving, from the neighbor base station, second control signaling indicating the second TTI format.

In some examples of the method, apparatuses, and non-transitory computer-readable medium described herein, the first control signaling indicating the first TTI format identifies a first path-loss exponent, a first power offset value, a first maximum power value, a first maximum power reduction value, or any combination thereof, and the second control signaling indicating the second power control configuration identifies a second path-loss exponent, a second power offset value, a second maximum power value, a second maximum power reduction value, or any combination thereof.

In some examples of the method, apparatuses, and non-transitory computer-readable medium described herein, receiving the control signaling may include operations, features, means, or instructions for receiving the control signaling indicating a configuration selection condition including a cell edge condition, a duplexing mode condition for the neighbor base station, a slot type condition, a beamforming condition, or any combination thereof, where one of the first power control configuration or the second power control configuration may be selected based on the configuration selection condition.

Some examples of the method, apparatuses, and non-transitory computer-readable medium described herein may further include operations, features, means, or instructions for receiving a media access control control element (MAC-CE) indicating one of the first power control configuration or the second power control configuration.

Some examples of the method, apparatuses, and non-transitory computer-readable medium described herein may further include operations, features, means, or instructions for receiving a grant scheduling transmission of the uplink message in the first TTI.

In some examples of the method, apparatuses, and non-transitory computer-readable medium described herein, receiving the control signaling may include operations, features, means, or instructions for receiving the control signaling indicating the first power control configuration that identifies a first initial transmission power for the uplink message that may be a random access message and a first power ramp value, and the second power control configuration that identifies a second initial transmission power for the random access message and a second power ramp value.

Some examples of the method, apparatuses, and non-transitory computer-readable medium described herein may further include operations, features, means, or instructions for monitoring for a random access response message based on transmitting the random access message and transmitting a second random access message in accordance with the first power ramp value or the second power ramp value based on the monitoring.

A method for wireless communication at a serving base station is described. The method may include transmitting, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band and receiving an uplink message in accordance with one of the first power control configuration or the second power control configuration based on a first TTI format of the serving base station and a second TTI format of the neighbor station corresponding to a first TTI, where the uplink message is received during the first TTI.

An apparatus for wireless communication at a serving base station is described. The apparatus may include a processor, memory coupled with the processor, and instructions stored in the memory. The instructions may be executable by the processor to cause the apparatus to transmit, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band and receive an uplink message in accordance with one of the first power control configuration or the second power control configuration based on a first TTI format of the serving base station and a second TTI format of the neighbor station corresponding to a first TTI, where the uplink message is received during the first TTI.

Another apparatus for wireless communication at a serving base station is described. The apparatus may include means for transmitting, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band and means for receiving an uplink message in accordance with one of the first power control configuration or the second power control configuration based on a first TTI format of the serving base station and a second TTI format of the neighbor station corresponding to a first TTI, where the uplink message is received during the first TTI.

A non-transitory computer-readable medium storing code for wireless communication at a serving base station is described. The code may include instructions executable by a processor to transmit, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band and receive an uplink message in accordance with one of the first power control configuration or the second power control configuration based on a first TTI format of the serving base station and a second TTI format of the neighbor station corresponding to a first TTI, where the uplink message is received during the first TTI.

In some examples of the method, apparatuses, and non-transitory computer-readable medium described herein, transmitting the control signaling may include operations, features, means, or instructions for transmitting the control signaling indicating the first TTI format, the second TTI format, or both.

Some examples of the method, apparatuses, and non-transitory computer-readable medium described herein may further include operations, features, means, or instructions for transmitting a grant scheduling transmission of the uplink message in the first TTI, where the grant indicates one of the first power control configuration or the second power control configuration.

In some examples of the method, apparatuses, and non-transitory computer-readable medium described herein, receiving the grant may include operations, features, means, or instructions for transmitting the grant including a transmit power command indicating one of the first power control configuration or the second power control configuration.

In some examples of the method, apparatuses, and non-transitory computer-readable medium described herein, the transmit power command includes one or more bits indicating one of the first power control configuration or the second power control configuration.

Some examples of the method, apparatuses, and non-transitory computer-readable medium described herein may further include operations, features, means, or instructions for transmitting the control signaling includes transmitting control signaling indicating the first TTI format.

In some examples of the method, apparatuses, and non-transitory computer-readable medium described herein, the control signaling indicating the first TTI format identifies a path-loss exponent, a power offset value, a maximum power value, a maximum power reduction value, or any combination thereof.

In some examples of the method, apparatuses, and non-transitory computer-readable medium described herein, transmitting the control signaling may include operations, features, means, or instructions for transmitting the control signaling indicating a configuration selection condition including a cell edge condition, a duplexing mode condition for the neighbor base station, a slot type condition, a beamforming condition, or any combination thereof.

Some examples of the method, apparatuses, and non-transitory computer-readable medium described herein may further include operations, features, means, or instructions for transmitting a MAC-CE indicating one of the first power control configuration or the second power control configuration.

Some examples of the method, apparatuses, and non-transitory computer-readable medium described herein may further include operations, features, means, or instructions for transmitting a grant scheduling transmission of the uplink message in the first TTI.

In some examples of the method, apparatuses, and non-transitory computer-readable medium described herein, transmitting the control signaling may include operations, features, means, or instructions for transmitting the control signaling indicating the first power control configuration that identifies a first initial transmission power for the uplink message that may be a random access message and a first power ramp value, and the second power control configuration that identifies a second initial transmission power for the random access message and a second power ramp value.

Some examples of the method, apparatuses, and non-transitory computer-readable medium described herein may further include operations, features, means, or instructions for transmitting a random access response message based on receiving the random access message and receiving a second random access message in accordance with the first power ramp value or the second power ramp value based on the transmitting.

DETAILED DESCRIPTION

Figure 1:
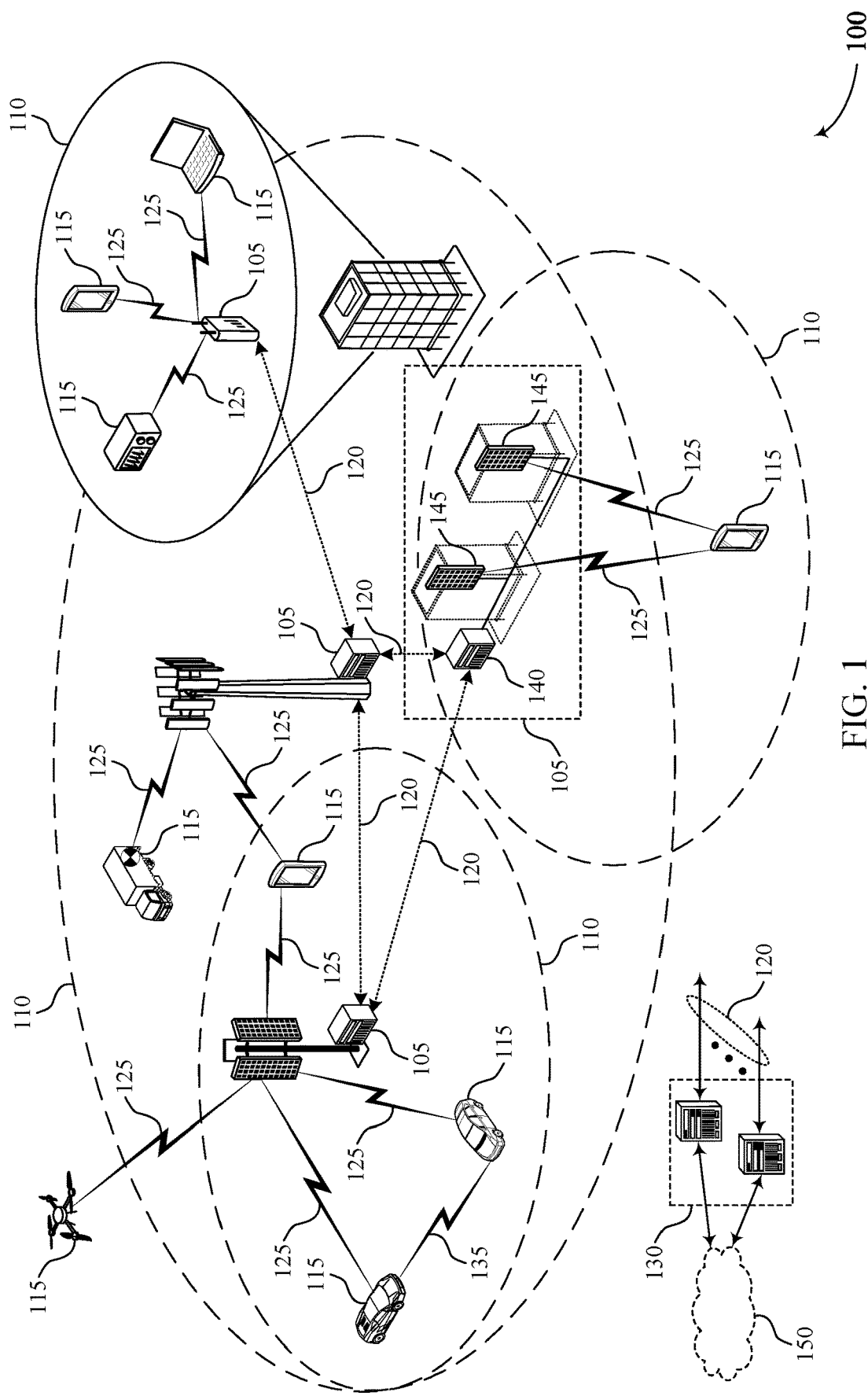
FIGS. 1 and 2 illustrate examples of wireless communications systems that support power control in serving cell with neighboring cells operating in different direction or full-duplex mode in accordance with aspects of the present disclosure.

In some wireless communications systems, a UE may communicate with a serving base station in a serving cell, where the serving cell is adjacent to one or more neighboring cells. Each of the one or more neighboring cells may be associated with respective neighboring base stations and UEs. The serving cell and the neighboring cells may communicate in a same direction in a given time interval. For example, in a slot, the serving cell and a neighboring cell may both operate in an uplink direction, where the serving base station and the neighboring base station may configure the slot for uplink transmission in a same frequency band. However, in some cases, the serving cell and the neighboring cell may communicate in different directions in a same slot, which may introduce interference between the two cells.

For example, in opportunistic conversion for cross-borders, the serving base station may convert a downlink-configured slot into an uplink slot to reduce latency and improve reliability in receiving uplink transmissions from a UE, while the neighboring base station remains in downlink for the slot. In opportunistic sub-band full duplex operations, the serving base station may determine that a quality of service threshold is satisfied and may convert a downlink slot to a full duplex slot; in such cases, the serving base station may communicate in both uplink and downlink the slot, while the neighboring base station may only communicate in downlink. For dynamic time division duplexing (TDD), the serving base station may switch a slot from downlink to uplink or to full duplex, for example, to reduce latency of an uplink transmission, but doing so may cause interference for itself or its neighbors. In dynamic TDD, cross-border and full-duplex operations, a serving cell and a neighboring cell may experience different communications direction in the same frequency band. For example, a serving cell might be operating in an uplink slot while the neighboring cell in a downlink or full-duplex slot. In such scenarios, an uplink transmission by a first UE may cause interference to a second UE in the neighboring cell if operating in downlink slot or to the neighboring cell on the uplink. Interference is different in both cases and hence, may benefit from power control that may depend from the transmission direction of the neighboring cell.

Conventional wireless systems do not provide techniques to handle power control differently in such scenarios. As described herein, power control in such scenarios may utilize knowledge of the neighboring cell transmission direction to manage interference to a neighboring cell and one or more UEs communicating with the neighboring cell. The techniques described herein may reduce cross link interference (CLI) interference and cross base station interference, including in full-duplex operation where a same resource is configured with two transmission directions.

In such examples, the serving base station and the neighboring base station are no longer communicating in the same direction, but are using the same resources (e.g., time resources, frequency resources). That is, the serving base station may communicate in uplink while the neighboring base station may communicate in downlink in the same frequency band and the same slot, which may introduce or increase interference. In cases where the UE transmitting uplink to the serving base station is near a cell edge, the interference may be especially disruptive due to the close proximity of the UE to the neighboring cell.

To adapt to scenarios where the serving cell and the neighboring cell(s) are operating in different directions in a time interval, such as a transmission time interval (TTI), the UE may adjust a transmission power of an uplink transmission to the serving base station. The serving base station may configure the UE with multiple power configurations from which to select. For example, the serving base station may indicate (e.g., via control signaling) a first power control configuration to use when the serving cell and the neighboring cell are communicating in a same direction and a second power control configuration to use when the serving cell and the neighboring cell are communicating in different directions. In some cases, the serving base station may additionally indicate a TTI format (e.g., a slot format) of the neighboring base station, a TTI format of the serving base station, the power control configuration that the UE should use, one or more power control parameters, a configuration selection condition, or some combination thereof, among other examples.

The UE may determine the direction of communications in the neighboring cell, for example, based on a TTI format of the neighboring base station and a TTI format of the serving base station for the TTI, and may select the appropriate power control configuration. The UE may use the selected power control configuration to transmit an uplink message to the serving base station during the TTI. That is, the UE may transmit the uplink message in accordance with the selected power control configuration, e.g., by using associated power control parameters to determine a transmit power for the uplink message.

Aspects of the disclosure are initially described in the context of wireless communications systems. Aspects of the disclosure are then described in the context of a slot pattern and a process flow. Aspects of the disclosure are further illustrated by and described with reference to apparatus diagrams, system diagrams, and flowcharts that relate to power control in serving cell with neighboring cells operating in different direction or full-duplex mode.

FIG. 1 illustrates an example of a wireless communications system 100 that supports power control in serving cell with neighboring cells operating in different direction or full-duplex mode in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 providing coverage to a UE 115 in a cell may be considered a serving base station 105 for the UE 115, where the cell may be referred to as a serving cell. Cells that are adjacent to the serving cell may be considered neighboring cells, and each neighboring cell may include a neighboring base station 105 that serves a neighboring UE 115. In some examples, the serving base station 105 and the neighboring base stations 105 may operate in a same communication direction within a same or similar frequency band during a same time period, such as a transmission time interval (TTI) (e.g., a slot). For example, the serving base station 105 and a neighboring base station 105 may both configure a TTI for uplink transmission. The UE 115 and a neighboring UE 115 may both transmit one or more uplink transmissions to the serving base station 105 and the neighboring base station 105, respectively, during the configured TTI.

In some examples, the serving base station 105 may communicate in a direction that is different from the communication direction of the neighboring base station 105. For example the serving base station 105 and the neighboring base station 105 may be geographically located on opposite sides of a border between two countries. During slots (e.g., all slots) of asynchronous schemes or during flexible slots of semi-synchronous schemes, the serving base station 105 and the neighboring base station 105 may utilize the same or different traffic directions, which may reduce interference or high jamming between the serving base station 105 and the neighboring base station 105. In some cases, the separation of the serving base station 105 and the neighboring base station 105 over the country border may mean that the serving base station 105 and the neighboring base station 105 operate in a same or similar frequency band but may not be capable of collaboratively configuring a TTI for a same communication direction.

Additionally, or alternatively, the serving base station 105 (e.g., or the neighboring base station 105) may convert (e.g., switch) the direction of communications of a slot. For instance, a slot may be configured for downlink transmissions by both the serving base station 105 and the neighboring base station 105. The serving base station 105 may determine to convert the slot to uplink, while the neighboring base station 105 may still use the slot for downlink. As a specific example, the serving base station 105 may perform opportunistic conversion for cross-borders, where the serving base station 105 may opportunistically convert a pre-configured downlink slot to an uplink slot; the serving base station 105 may therefore communicate in uplink in the slot while the neighboring base station 105 communicates in downlink in the slot. Opportunistic conversion may reduce latency associated with a dedicated uplink slot (such as for ultra reliable low latency communications (URLLC)) and, in some cases, may increase reliability of uplink transmissions in the slot. In some examples, for a base station 105 to reliably receive an uplink transmission, such as for URLLC use cases, base station 105 may use either a dedicated uplink slot (e.g., a semi-synchronous scheme) which may suffer from long latency or use uplink slots with possible' interference from other operators (e.g., cross borders).

In some cases, the serving base station 105 may utilize opportunistic sub-band full duplex (SBFD) operations, where the serving base station 105 may convert a slot (e.g., a legacy or half-duplex slot, such as a downlink slot) to a full duplex slot. For example, a full duplex capable gNB may convert a legacy downlink slot into a full duplex slot with simultaneous uplink reception and downlink transmission in same frequency (e.g., in band full duplex (IBFD)) or sub-band full duplex (SBFD). For example, the serving base station 105 may sense a channel (e.g., using a subset of antennas or an antenna panel) and determine the amount of interference experienced by a downlink slot. For instance, the serving base station 105 may determine whether one or more slots experiences an acceptable amount of jamming (e.g., little jamming), such as interference from other operators either in a co-channel or in an adjacent channel. For example, the serving base station 105 may monitor quality of service of one or more slots of the uplink channel, such as uplink to interference plus noise ratio (UL SINR) or uplink reference signal received strength (RSRS) meeting a certain threshold. If an observed downlink slot experiences meets a quality of service threshold or a quality of service requirement (e.g., experiences relatively little jamming), the serving base station 105 may convert the downlink slot into a full duplex slot. For example, the serving base station 105 may convert a DL slot into SBFD slot, and may indicate a slot formation indicator (SFI) in a group common message transmitted to one or more UEs to indicate the new slot pattern. The serving base station 105 may also indicate the change of slot format to other operators or neighbor base stations via inter-gNB link.

Additionally, or alternatively, the serving base station 105 may operate using dynamic time-division multiplexing (TDD), and may dynamically convert the downlink slot to an uplink slot or to a full duplex slot. In full duplex communications, both uplink and downlink communications may occur (e.g., simultaneously) in a same slot (e.g., in a same frequency band, such as in band frequency duplex (IBFD) or in a same subband, such as SBFD); thus, the serving base station 105 may communicate uplink and downlink in the slot.

While converting a downlink slot to an uplink slot or a full duplex slot may reduce latency in uplink communications in the slot, the difference in communication directions of the slot between the serving base station 105 and the neighboring base station 105 may introduce or increase interference, for example, at the neighboring base station 105, the neighboring UE 115, or both. More specifically, interference may occur because the serving base station 105 and the neighboring base station 105 utilize the same or a similar frequency band in the same slot (i.e., the same time resources and frequency resources) for the opposing communications. For instance, if the UE 115 transmits an uplink message to the serving base station 105 while the neighboring UE 115 receives a downlink message from the neighboring base station 105, the neighboring UE 115 may suffer increased interference due to the transmission of the uplink message.

According to the techniques described herein, the UE 115 may adjust a transmit power of the uplink message to avoid interfering with communications in the neighboring cell, e.g., between the neighboring base station 105 and the neighboring UE 115. The UE 115 may be configured with multiple power control configurations, where the UE 115 may select a power control configuration to use in determining the transmit power of the uplink message. For example, the UE 115 may receive control signaling that indicates the multiple power configurations and each of the power control configurations may be for a respective scenario; as an example, a first power control configuration (such as a legacy power control configuration) may be used when the neighboring cell is operating in a same communications direction as the serving cell in a same slot, and a second power control configuration may be used when the neighboring cell is operating in a different direction from the serving cell in the same slot. The UE 115 may select an appropriate power control configuration, for example, based on the direction of communications in the neighboring cell relative to directions of communication in the serving cell in the slot.

In some examples, the UE 115 may determine the direction of communications in the neighboring cell for the slot based on a slot format (e.g., a TTI format). For instance, the UE 115 may determine (e.g., based on receiving an indication of) a TTI format associated with the serving base station 105 for the slot and a TTI format associated with the neighboring base station 105 for the slot. In some cases, the UE 115 may receive an indication of the power control configuration to select, for instance, as part of a grant scheduling the uplink message, a MAC-CE, or the like. The UE 115 may use the selected power control configuration to determine the transmit power of the uplink message and may transmit the uplink message accordingly.

In some cases, the uplink message may be a random access message, e.g., used for a random access procedure between the UE 115 and the serving base station 105. In such cases, the power control configurations may identify an initial transmit power and a power ramp value for the random access message. The UE 115 may transmit the random access value using the initial transmit power of the selected power control configuration. If, for example, the UE 115 fails to receive a random access response message from the serving base station 105, the UE 115 may increment the transmit power by the power ramp value and may transmit a second random access message to the serving base station 105 at the higher transmit power. The UE 115 may continue increasing the transmit power until reaching a defined power level (e.g., a max power level) or the UE 115 completes the random access procedure with the base station 105 to successfully establish a connection therebetween.

Figure 2:
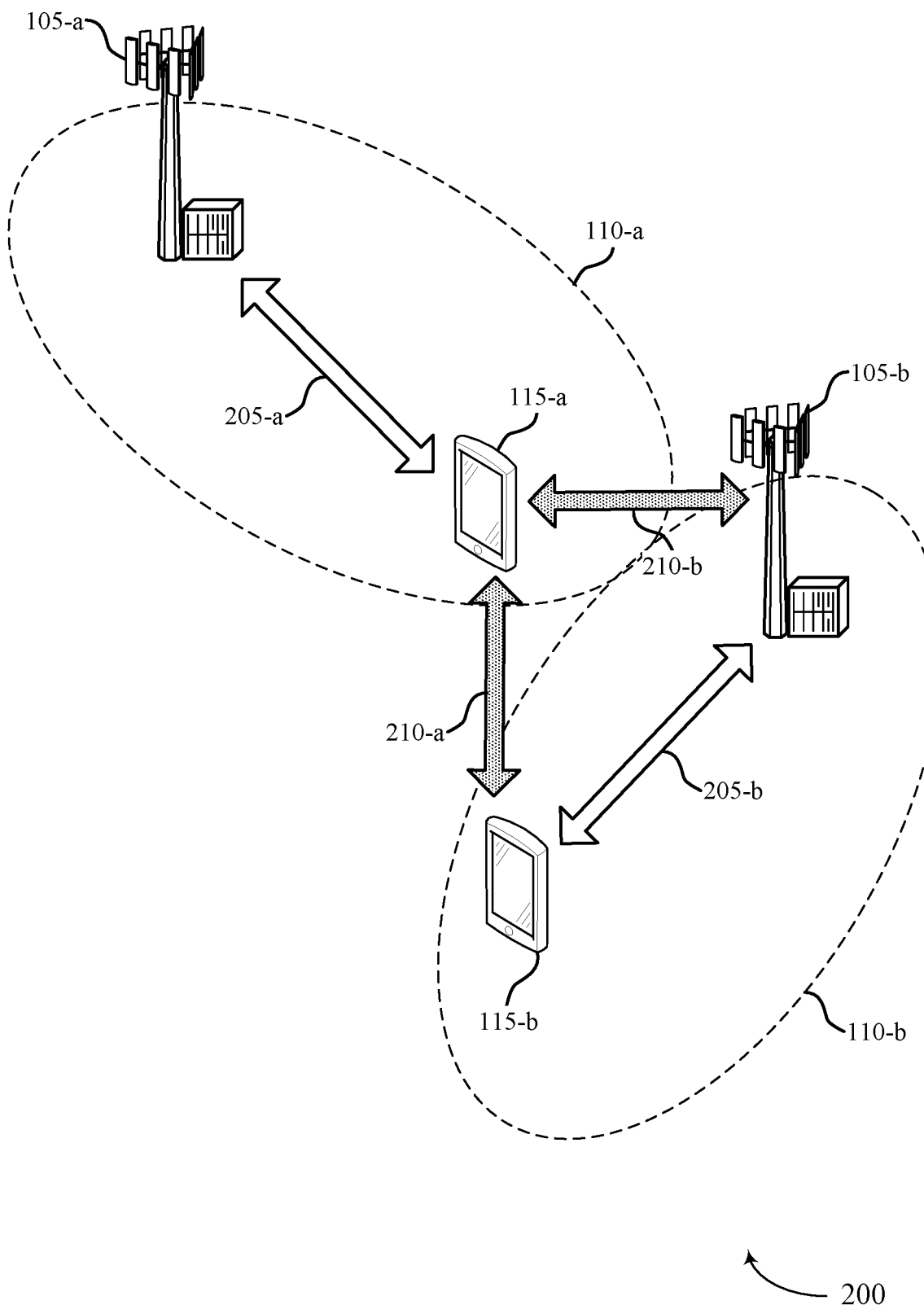

FIG. 2 illustrates an example of a wireless communications system 200 that supports power control in serving cell with neighboring cells operating in different direction or full-duplex mode in accordance with aspects of the present disclosure. The wireless communications system 200 may include a base station 105-a, a base station 105-b, a UE 115-a, and a UE 115-b, which may be examples of base stations 105 and UEs 115 as described with reference to FIG. 1. Each base station 105 may serve a UE 115 in a cell 110 and may communicate with the respective UE 115 over a communication link 205.

In the example of FIG. 2, the cells 110 may be adjacent to one another (e.g., may be neighboring cells). The cell 110-a may be referred to as a serving cell 110-a and the cell 110-b may be referred to as a neighboring cell 110-b. The base station 105-a may likewise be referred to as a serving base station 105-a and may communicate with the UE 115-a via a communication link 205-a, while the base station 105-b may be referred to as a neighboring base station 105-b and may communicate with the UE 115-b via a communication link 205-b.

The serving cell 110-a and the neighboring cell 110-b may operate in a same direction in a given time period. For example, the serving base station 105-a and the neighboring base station 105-b may configure a same slot for uplink transmission in a same or similar frequency band. The UE 115-a and the UE 115-b may transmit uplink messages to the serving base station 105-a and the neighboring base station 105-b, respectively, during the slot. The slot may be associated with or may have a format (e.g., a TTI format) based on the configured direction of communications.

In some scenarios, however, the serving cell 110-a and the neighboring cell 110-b may operate in at least partially different communication directions in a same slot in the frequency band. For example, as described with reference to FIG. 3, the serving base station 105-a may convert a downlink slot to an uplink slot or to a full duplex slot. In such examples, the serving base station 105-a and the UE 115-a may be communicating in uplink in the slot, while the neighboring base station 105-b and the UE 115-b may be communicating in downlink in the slot. As the same time resources and frequency resources are being used by both the serving cell 110-a and the neighboring cell 110-b, the conflicting communications directions may introduce or increase interference, e.g., for the UE 115-b, the neighboring base station 105-b, or both.

As an example, the UE 115-a may transmit an uplink message (e.g., a physical uplink shared channel (PUSCH) transmission) to the serving base station 105-a in the slot. The uplink transmission may cause interference 210-a at the UE 115-b as the UE 115-b attempts to receive a downlink transmission from the neighboring base station 105-b (e.g., via the communication link 205-b) in the slot. In some cases, the uplink transmission may introduce interference 210-b, e.g., at the neighboring base station 105-b. For instance, the uplink transmission may interfere with an uplink transmission from the UE 115-b to the neighboring base station 105-b. The interference 210-a and the interference 210-b may be further increased as the distance between the UE 115-a and the neighboring cell 110-b decreases. That is, the closer the UE 115-a is to the edge of the serving cell 110-a and/or the neighboring cell 110-b, the more the UE 115-b and the neighboring base station 105-b may suffer interference.

According to the techniques described herein, the UE 115-a may determine a transmit power to use for the uplink message based on the direction of communications in the neighboring cell 110-b, e.g., relative to the direction of communications in the serving cell 110-a. The UE 115-a may receive or be otherwise configured with two (or more) power control configurations, where a first power control configuration may be used by the UE 115-a when the serving cell 110-a and the neighboring cell 110-b are communicating in a same direction (e.g., in a same slot and a same or similar frequency band) and a second power control configuration may be used by the UE 115-a when the serving cell 110-a and the neighboring cell 110-b are communicating in different directions (e.g., in the same slot and the same or similar frequency band). The UE 115-a may select a power control configuration based on the direction of communications in the neighboring cell 110-b relative to directions of communication in the serving cell 110-a.

For example, a slot (e.g., a TTI) may be configured for a transmission direction in a same frequency band by the serving base station 105-a and the neighboring base station 105-b. The slot may have a format (e.g., a TTI format) based on the configured transmission direction. In some cases, the slot may be configured by the serving base station 105-a and the neighboring base station 105-b for transmission in a same direction. In such cases, the UE 115-a may select the first power control configuration to use for transmitting the uplink message. Alternatively, the slot may be configured by the serving base station 105-a at least partially for uplink transmission and by the neighboring base station 105-a at least partially for downlink transmission. Here, the UE 115-a may select the second power control configuration to use for transmitting the uplink message during the slot. In some examples, when a neighboring base station 105-a is operating in a communication direction opposite to the serving base station 105-a, the UE 115-a may use different sets of RRC configured power control parameters including a different path-loss exponent, a power offset that may take positive or negative value, a defined power value (e.g., maximum power configuration), a defined power reduction (e.g., maximum power reduction configuration), or any combination thereof. In an example, the UE 115-a may determine a transmit power for the uplink message based on the selected power control configuration according to Equation 1 below.

$$P_{PUSCH}(j,q,l) = \min\{P_{CMAX}, P_{P_{PUSCH}}(j) + 10 \cdot \log_{10}(2^\mu M_{RB}^{PUSCH}) + \alpha(j) \cdot PL(q) + \Delta_{TF} + f(l) + \text{power\_offset}\}$$

Equation 1 may include a number of layers f(l), an increment value $\Delta_{TF}$, a resource block parameter $M_{RB}^{PUSCH}$, and a path loss PL(q). Additionally, Equation 1 may include power control parameters, such as a path loss exponent $\alpha(j)$, a power offset value power_offset, a maximum power value $P_{CMAX}$, a maximum power reduction value, or any combination thereof. In some cases, the maximum power reduction value may be used to determine $P_{CMAX}$. In some examples, each of the power control configurations may be associated with one or more power control parameters, such that different power control configurations may be associated with different sets of one or more power control parameters. The UE 115-a may use Equation 1 to determine the transmit power $P_{PUSCH}(j, q, l)$, for example, by applying the one or more power control parameters that are associated with the selected power control configuration. In some examples, the power offset value may be dynamically indicated (e.g., in DCI) or RRC configured depending on the neighboring slot type. The indication of the power offset value may either come from the serving base station or the neighboring base station.

In some examples, the second power control configuration may be associated with power control parameters configured to obtain a transmit power that is higher or lower than a transmit power associated with (e.g., determined using) the first power control configuration. That is, the second power control configuration may enable the UE 115-a to adjust the transmit power in order to reduce cross link interference (CLI) (e.g., interference 210-a) or overcome cross base station interference (e.g., interference 210-b). As an example, in some cases, using a relatively lower transmit power for the uplink message may reduce the amount of interference 210-a at the UE 115-b. For instance, the second power control configuration may be associated with a negative power offset value (e.g., −3 dB), which may decrease the transmit power $P_{PUSCH}(j, q, l)$. Conversely, using a relatively higher transmit power may enable the uplink message to be received at the serving base station 105-a despite other surrounding interference, e.g., from the neighboring cell 110-b. In this case, the second power control configuration may be associated with a positive power offset value (e.g., 3 dB), which may increase the transmit power $P_{PUSCH}(j, q, l)$.

The UE 115-a may receive control signaling including an indication of the first and second power control configurations, for example, from the serving base station 105-a, the neighboring base station 105-b, or both. In some cases, the UE 115-a may receive a message including an indication of one of the first power control configuration or the second power control configuration, such that the UE 115-a selects the indicated power control configuration. For example, the UE 115-a may receive (e.g., from the serving base station 105-a), a grant that schedules transmission of the uplink message in the slot. The grant may include an indication of the first power control configuration or the second power control configuration. In some cases, the grant may include a transmit power command (TPC) that indicates the power control configuration (e.g., using one or more bits). As another example, the serving base station 105-*a* may transmit a MAC-CE to the UE 115-*a* that indicates the power control configuration.

In some examples, the UE 115-*a* may also receive an indication of the slot format (e.g., the TTI format) of the serving base station 105-*a*, an indication of the slot format for the neighboring base station 105-*b*, or both. For instance, the control signaling indicating the first and second power control configurations may also indicate the slot formats, or the UE 115-*a* may receive control signaling from the serving base station 105-*a* and control signaling from the neighboring base station 105-*b* that indicates respective slot formats. In some cases, the control signaling (e.g., indicating the slot format(s)) may also identify one or more of the power control parameters, e.g., for the UE 115-*a* to use in Equation 1.

In some cases, the UE 115-*a* may select a power control configuration based on a condition (e.g., a configuration selection condition) of the UE 115-*a*. For example, the UE 115-*a* may be configured (e.g., RRC configured) with one or more configuration selection conditions, or the control signaling that indicates the power control configurations may indicate the configuration selection condition(s). The UE 115-*a* may select the power control configuration based on if a condition is met. For instance, a configuration selection condition may include a cell edge condition (e.g., whether the UE 115-*a* is close to a cell edge), a duplexing mode condition for the neighboring base station 105-*b* (e.g., whether the neighboring base station 105-*b* is operating in half duplex or full duplex mode), a slot type condition (e.g., whether the neighboring base station 105-*b* is operating in a full duplex slot, a downlink slot, or an uplink slot, for instance, during transmission of the uplink message by the UE 115-*a*), a beamforming condition (e.g., a beam direction of the uplink message transmission), or some combination thereof. For example, if an uplink beam direction is in a direction away from the neighboring cell, the UE 115-*a* may use a higher transmission power. If an uplink beam direction is in a direction toward a neighboring cell, the UE 115-*a* may use a lower transmission power. In some examples, a control message (e.g., DCI or a grant) scheduling an uplink message by the UE 115-*a* may indicate which power control configuration to use for transmission of the uplink message. In some examples, a control message (e.g., a MAC CI) may indicate which power control configuration to use for transmission of one or more uplink messages.

As an example, the UE 115-*a* may be close to the edge of the serving cell 105-*a* and therefore may be close to the neighboring cell 105-*b*. The UE 115-*a* may select the second power condition based on the cell edge condition to avoid causing interference at the neighboring cell 105-*b*. Alternatively, the beamforming condition may be such that the beam used by the UE 115-*a* to transmit the uplink message in a direction away from the neighboring cell 105-*b*. Associated interference may be less likely in this condition, and the UE 115-*a* may select a power control configuration that has a higher transmit power.

The UE 115-*a* may utilize power control configurations for other scenarios and procedures, such as random access procedures. Each of the power control configurations may identify a respective initial transmit power for a random access message transmitted by the UE 115-*a* and a power ramp value. If the UE 115-*a* determines that the neighboring cell 105-*b* is operating in a different communication direction than the serving cell 105-*a*, the UE 115-*a* may select the corresponding power control configuration to use for the random access procedure. The UE 115-*a* may determine and use a transmit power based on the selected power control configuration to transmit a random access message (e.g., a random access channel (RACH) preamble message) transmitted to a base station (e.g., the serving base station 105-*a*) to initiate the random access procedure. For example, the UE 115-*a* may be aware of a TDD pattern of the neighboring cell 105-*b* and the neighboring cell 105-*b* may be operating in a downlink slot or a full-duplex slot when the UE 115-*a* is performing the random access procedure, and the UE may use the RRC configured initial transmit power and power ramping value that are configured specifically for this situation (e.g., the power control configuration configured for random access). If the UE is not configured with such initial transmit power or power ramping step for random access, the UE may use the parameters configured for initial access (e.g., the power control configuration configured for random access).

The UE 115-*a* may monitor for a random access response message from the base station. If the UE 115-*a* determines that the random access message failed (e.g., based on the monitoring), the UE 115-*a* may utilize the power ramp value associated with the selected power control configuration to incrementally increase the transmit power to retransmit the random access message.

Figure 3:
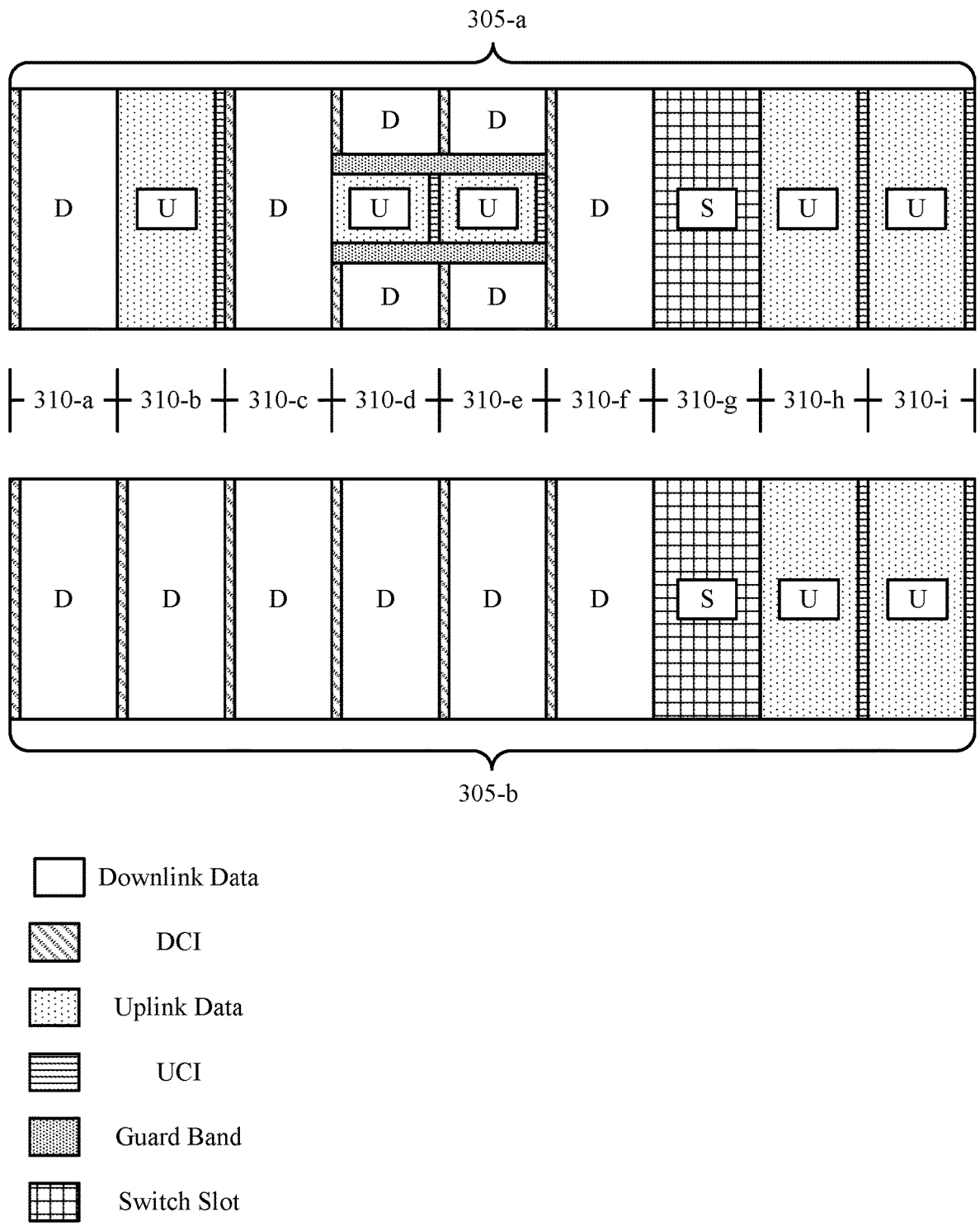
FIG. 3 illustrates an example of a slot pattern in accordance with aspects of the present disclosure.

FIG. 3 illustrates an example of a slot pattern 300 that supports power control in serving cell with neighboring cells operating in different direction or full-duplex mode in accordance with aspects of the present disclosure. In some examples, the slot pattern 300 may implement aspects of or be implemented by the wireless communications systems 100 or 200. For example, the slot pattern 300 may include slots 310 used for communications between a base station and a UE, where each slot 310 may be configured for uplink, downlink, or full duplex communications.

The slot pattern 300 may include a slot format pattern 305-*a* and a slot format pattern 305-*b* for the slots 310. The slot format pattern 305-*a* may be used by a serving base station for communications with a UE, where the serving base station may configure each slot 310 for communications in a respective direction. For example, slots 310-*a*, 310-*c*, and 310-*f* may be configured by the serving base station for downlink communications, while slots 310-*b*, 310-*h*, and 310-*i* may be configured for uplink communications. Slots 310-*d* and slots 310-*e* may be configured for full duplex communications, such that each slot 310-*d* and 310-*e* may include both downlink and uplink communications. Slot 310-*g* may be an example of a switching slot, e.g., during which the direction of communications is switched from downlink to uplink. Each slot 310 may include data and control information for the corresponding communication direction; for instance, a downlink slot (such as slot 310-*a*) may include downlink data and downlink control information (DCI), while an uplink slot (such as slot 310-*b*) may include uplink data and uplink control information (UCI). A full duplex slot, such as slot 310-*d*, may include downlink data and DCI and uplink data and UCI, as well as a guard band between the uplink data and the downlink data (e.g., to reduce interference between the opposing directions of communication).

The slot format pattern 305-*b* may be configured by a neighboring base station for communications with a neighboring UE in a neighboring cell, i.e., a cell adjacent to a serving cell associated with the serving base station. The neighboring base station may configure slots 310-*a* through 310-*f* for downlink communications and slots 310-*h* and 310-*i* for uplink communications, while slot 310-*g* may be a switching slot.

As described herein, the serving base station and the neighboring base station may communicate in a same communications direction in a same slot 310, such as slots 310-*a*, 310-*c*, 310-*f*, 310-*h*, and 310-*i*. In some cases, the serving base station and the neighboring base station may configure a slot 310 for the same direction of communications, for example, to reduce or avoid interference between the serving base station and the neighboring base station. However, in some examples, the serving base station and the neighboring base station may communicate in at least partially different communications directions. For example, the serving base station and the neighboring base station may be geographically located on opposite sides of a border between two countries, such that the serving base station and the neighboring base station operate in a same or similar frequency band but may not be capable of collaboratively configuring a slot 310 for a same communication direction.

Additionally, or alternatively, the serving base station may convert the direction of communications of a slot 310. In some examples, the serving base station may determine that converting a slot 310 may provide reduced latency for communications in the slot 310. For instance, the slot 310-*b* may be configured for downlink communications by the serving base station and the neighboring base station. The serving base station may determine to convert the slot 310-*b* to uplink, while the neighboring base station may maintain the downlink configuration of slot 310-*b*. If the serving base station and the neighboring base station are located across a country border, for example, the serving base station may perform opportunistic conversion for cross-borders to convert the slot 310-*b*. A dedicated uplink slot, such as slot 310-*h*, may be associated with increased latency, or may suffer from interference from other base stations across the country border. Opportunistic conversion may therefore enable the serving base station to instead receive an uplink transmission in the converted slot 310-*b* to reduce latency and increase reliability of the uplink transmission.

In some cases, the serving base station may utilize opportunistic sub-band full duplex operations and may convert a slot 310 to a full duplex slot. For example, the slot 310-*d* and the slot 310-*e* may be configured by the serving base station for downlink communications. The serving base station may sense a channel associated with the slot 310-*d* and the slot 310-*e* and may determine if one or both of the slots 310 experience relatively little jamming (e.g., from the serving base station in an adjacent channel or from other devices in the same channel). If the slot 310-*d* or the slot 310-*e* experiences relatively little jamming (e.g., meets a quality of service threshold or a quality of service requirement), the serving base station may convert the slots 310-*d* and 310-*e* into full duplex slots. In other examples, the serving base station may operate using dynamic TDD, for example, to increase flexibility in resource utilization. In dynamic TDD, the serving base station may reconfigure a slot 310 for communications in a different direction. For instance, the serving base station may convert a downlink slot to an uplink slot or to a full duplex slot; as illustrated in FIG. 3, the serving base station may convert the slot 310-*b* to an uplink slot and the slots 310-*d* and 310-*e* to full duplex slots. Again, in such scenarios, the neighboring base station may maintain the downlink configuration for the slots 310-*b*, 310-*d*, and 310-*e*, such that the serving base station and the neighboring base station may be communicating in different directions (e.g., uplink and downlink) in the slot 310-*b* and at least partially in different directions in the slots 310-*d* and 310-*e*.

Although converting a downlink slot to an uplink slot or a full duplex slot may reduce latency in uplink communications in the slot 310, the difference in communication directions of the slot between the serving base station and the neighboring base station may introduce or increase interference, for example, at the neighboring base station, the neighboring UE, or both. More specifically, interference may occur because the serving base station and the neighboring base station utilize the same or a similar frequency band in the same slot 310 (i.e., the same time resources and frequency resources) for the opposing communications. For instance, if the UE transmits an uplink message to the serving base station in the slot 310-*b* while the neighboring UE receives a downlink message from the neighboring base station in the slot 310-*b*, the neighboring UE may suffer increased interference during the slot 310-*b*, e.g., due to the transmission of the uplink message.

As described herein, a UE may receive, from a base station (e.g., the serving base station), control signaling that indicates power control configurations for the UE to use to determine a transmit power for an uplink transmission in a slot 310. With reference to FIG. 2, the UE may select and use a first power control configuration when the serving base station and the neighboring base station are communicating in a same direction in a slot 310 and a second power control configuration when the serving base station and the neighboring base station are communicating in different directions in a slot 310. For example, as illustrated in FIG. 3, if a slot 310 is configured by both the serving base station and the neighboring base station for uplink communications (e.g., slot 310-*h*, slot 310-*i*), the UE may use the first power control configuration. If a slot 310 is instead configured (e.g., or converted) by the serving base station at least partially for uplink communications and configured by the neighboring base station for downlink communications (e.g., slot 310-*b*, slot 310-*d*, slot 310-*e*), the UE may use the second power control configuration.

For instance, the UE may determine that the neighboring base station has configured slot 310-*b* for downlink, while the serving base station has configured slot 310-*b* for uplink; accordingly, the UE may select the second power control configuration. The UE may transmit the uplink message to the serving base station in accordance with the second power control configuration. In slot 310-*d*, the UE may determine that the serving base station is configured for full duplex communications while the neighboring base station is configured for downlink communications. The UE may transmit the uplink message in accordance with the second power control configuration during the slot 310-*d*. Alternatively, in slot 310-*h*, the UE may determine that both the serving base station and the neighboring base station are communicating in an uplink direction, and the UE may select the first power control configuration to transmit the uplink message in the slot 310-*h*.

Figure 4:
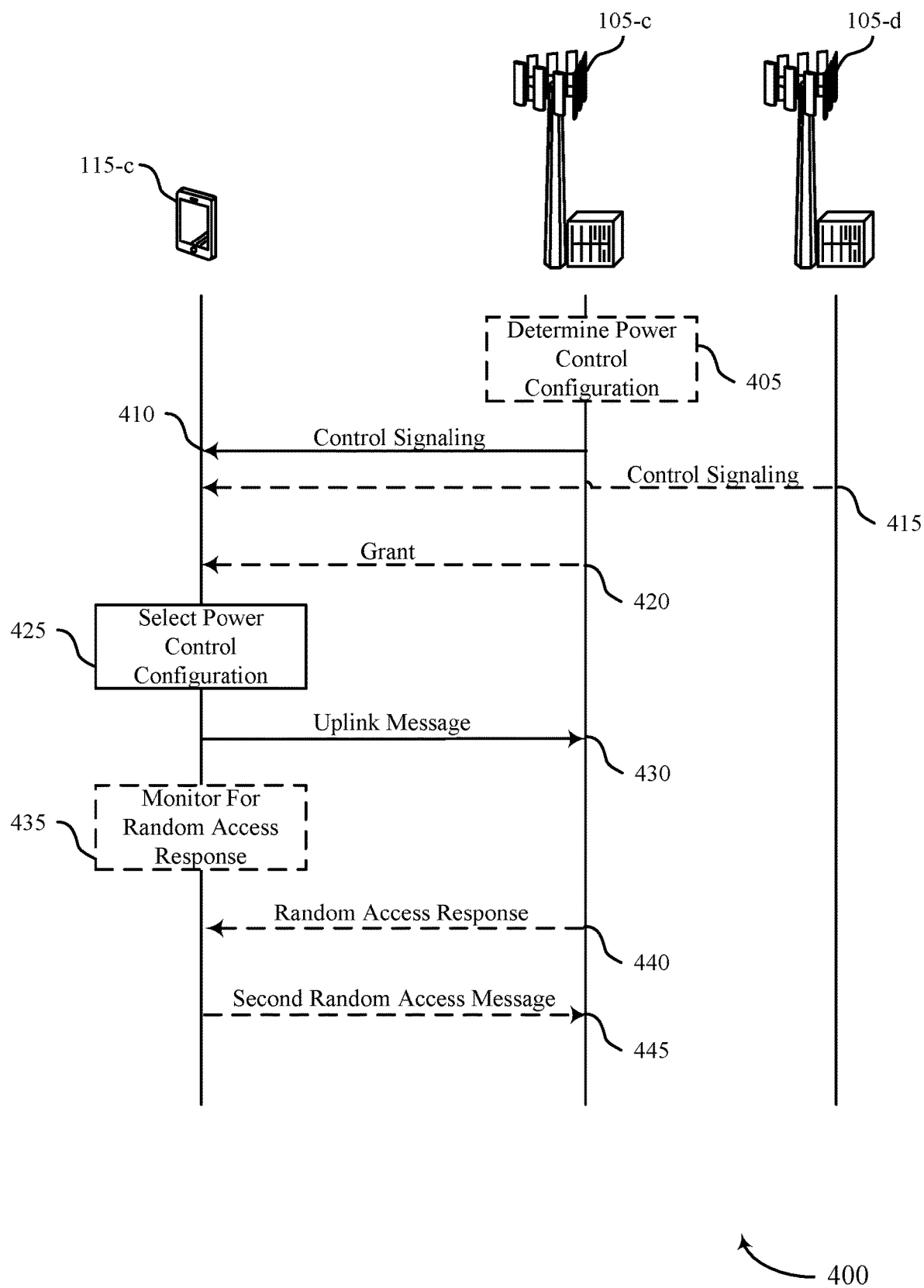
FIG. 4 illustrates an example of a process flow in accordance with aspects of the present disclosure.

FIG. 4 illustrates an example of a process flow 400 that supports power control in serving cell with neighboring cells operating in different direction or full-duplex mode in accordance with aspects of the present disclosure. In some examples, the process flow 400 may implement aspects of wireless communication systems 100 or 200. For example, the process flow 400 may include a base station 105-*c* associated with a first cell, a base station 105-*d* associated with a second cell, and a UE 115-*c*, which may be examples of corresponding wireless devices as described herein. In the following description of the process flow 400, the operations between the base station 105-*c*, the base station 105-*d*, and the UE 115-*c* may be transmitted in a different order than the order shown, or the operations performed by the base station 105-*c*, the base station 105-*d*, and the UE 115-*c* may be performed in different orders or at different times. Certain operations may also be left out of the process flow 400, or other operations may be added to the process flow 400. While the base station 105-*c*, the base station 105-*d*, and the UE 115-*c* are shown performing operations of process flow 400, any wireless device may perform the operations shown. Further, while FIG. 4 illustrates an example of communications between the base station 105-*c*, the base station 105-*d*, and the UE 115-*c*, the techniques described herein may be applied to communications between any number of wireless devices.

In the example of FIG. 4, the UE 115-*c* may be served by the base station 105-*c*, which may be an example of a serving base station and may be associated with a serving cell. The base station 105-*d* may be an example of a neighboring base station associated with a neighboring cell that is adjacent or in close proximity to the serving cell.

At 405, the base station 105-*c* may determine power control configurations for the UE 115-*c* to use. For example, the base station 105-*c* may determine a first power control configuration for use when the serving cell and the neighboring cell are communicating in a same direction in a same TTI (e.g., same slot) and a same or similar frequency band. That is, the first power control configuration may be used when the base station 105-*c* and the base station 105-*d* may configure the TTI for uplink transmission in the same frequency band. The base station 105-*c* may determine a second power control configuration for use when the serving cell and the neighboring cell are communicating (e.g., at least partially) in different directions in the same TTI and the same or similar frequency band. Here, the second power control configuration may be used when the base station 105-*c* configures the TTI at least partially for uplink transmission and the base station 105-*d* configures the TTI for at least partially for downlink transmission in the same frequency band.

At 410, the base station 105-*c* may transmit, to the UE 115-*c*, control signaling (e.g., RRC signaling, a MAC-CE, DCI) indicating the first power control configuration and the second power control configuration. In some examples, the control signaling may include an indication of a TTI format associated with the base station 105-*c* for a TTI, where the TTI may be for transmission of an uplink message by the UE 115-*c*. Additionally or alternatively, the control signaling may include an indication of a TTI format associated with the base station 105-*d* for the TTI. In some cases, the control signaling may include an indication of a configuration selection condition, such as a cell edge condition, a duplexing mode for the base station 105-*d*, a slot type condition, a beamforming condition, or some combination thereof.

In some cases, the uplink message may be a random access message, and the control signaling that indicates the first power control configuration may identify a first initial transmission power for the uplink message and a first power ramp value, while the control signaling that indicates the second power control configuration may identify a second initial transmission power for the uplink message and a second power ramp value.

At 415, the base station 105-*d* may optionally transmit, to the UE 115-*c*, control signaling indicating the TTI format associated with the base station 105-*d* for the TTI. For example, if the control signaling transmitted by the base station 105-*c* at 410 indicates the TTI format associated with the base station 105-*c* for the TTI, the base station 105-*d* may transmit additional control signaling at 415 to indicate the TTI format of the base station 105-*d* for the TTI.

In some examples, the control signaling that indicates the TTI format of the base station 105-*c* (e.g., transmitted by the base station 105-*c* at 410) may identify a first path loss exponent, a first power offset value, a first maximum power value, a first maximum power reduction value, or some combination thereof, and the control signaling that indicates the TTI format of the base station 105-*d* (e.g., transmitted by the base station 105-*d* at 415) may identify a second path loss exponent, a second power offset value, a second maximum power value, a second maximum power reduction value, or some combination thereof. In an example, a power offset value may be a positive or negative value.

At 420, the base station 105-*c* may transmit, and the UE 115-*c* may receive, a grant scheduling transmission of the uplink message during the TTI. In some examples, the grant may include an indication of one of the first power control configuration or the second power control configuration. For instance, the grant may include a TPC that indicates one of the first power control configuration or the second power control configuration. In some cases, the TPC may include one or more bits, where the one or more bits may indicate the first power control configuration or the second power control configuration. In some cases, the TPC may be transmitted in a control message or control signaling other than a grant.

At 425, the UE 115-*c* may select one of the first power control configuration or the second power control configuration based on the TTI format of the base station 105-*c* and the TTI format of the base station 105-*d* for the TTI. For example, if the TTI format of the base station 105-*d* is different than the TTI format of the serving base station 105-*d*, the UE 115-*c* may select the second power control configuration. If the TTI format of the base station 105-*d* is the same as the TTI format of the serving base station 105-*d*, the UE 115-*c* may select the first power control configuration. In some examples, the UE 115-*c* may select the power control configuration based on an indication received in the grant at 420, a TPC received (e.g., in the grant, a control message, or control signaling) at 420, a configuration selection condition indicated in the control signaling received at 410, or any combination thereof. In some cases, the base station 105-*c* may transmit, and the UE 115-*c* may receive, a MAC-CE indicating one of the first power control configuration or the second power control configuration, and the UE 115-*c* may select a power control configuration based on the MAC-CE.

At 430, the UE 115-*c* may transmit, and the base station 105-*c* may receive, the uplink message during the TTI. The UE 115-*c* may transmit the uplink message in accordance with the power control configuration selected at 425 (i.e., based on a transmit power determined using the power control configuration selected at 425). In some examples, the uplink message may be a random access message, and the UE 115-*c* may transmit the random access message based on the initial transmission power identified by the selected power control configuration.

At 435, if the uplink message is a random access message, the UE 115-*c* may monitor for a random access response message from the base station 105-*c*.

At 440, the base station 105-*c* may transmit, and the UE 115-*c* may receive, a random access response message.

At 445, if the UE 115-*c* received a random access response message from the base station 105-*c* at 440, the UE 115-c may transmit a second random access message to the base station 105-c. The second random access message may be transmitted in accordance with the selected power control configuration.

If the UE 115-c did not receive a random access response message from the base station 105-c at 440, the UE 115-c may transmit the second random access message at 445 in accordance with the power ramp value identified by the selected power control configuration. For example, if the UE 115-c selected the second power control configuration and failed to receive a random access response message at 440, the UE 115-c may transmit the second random access message at 445 in accordance with the power ramp value identified in the second power control configuration.

Figure 5:
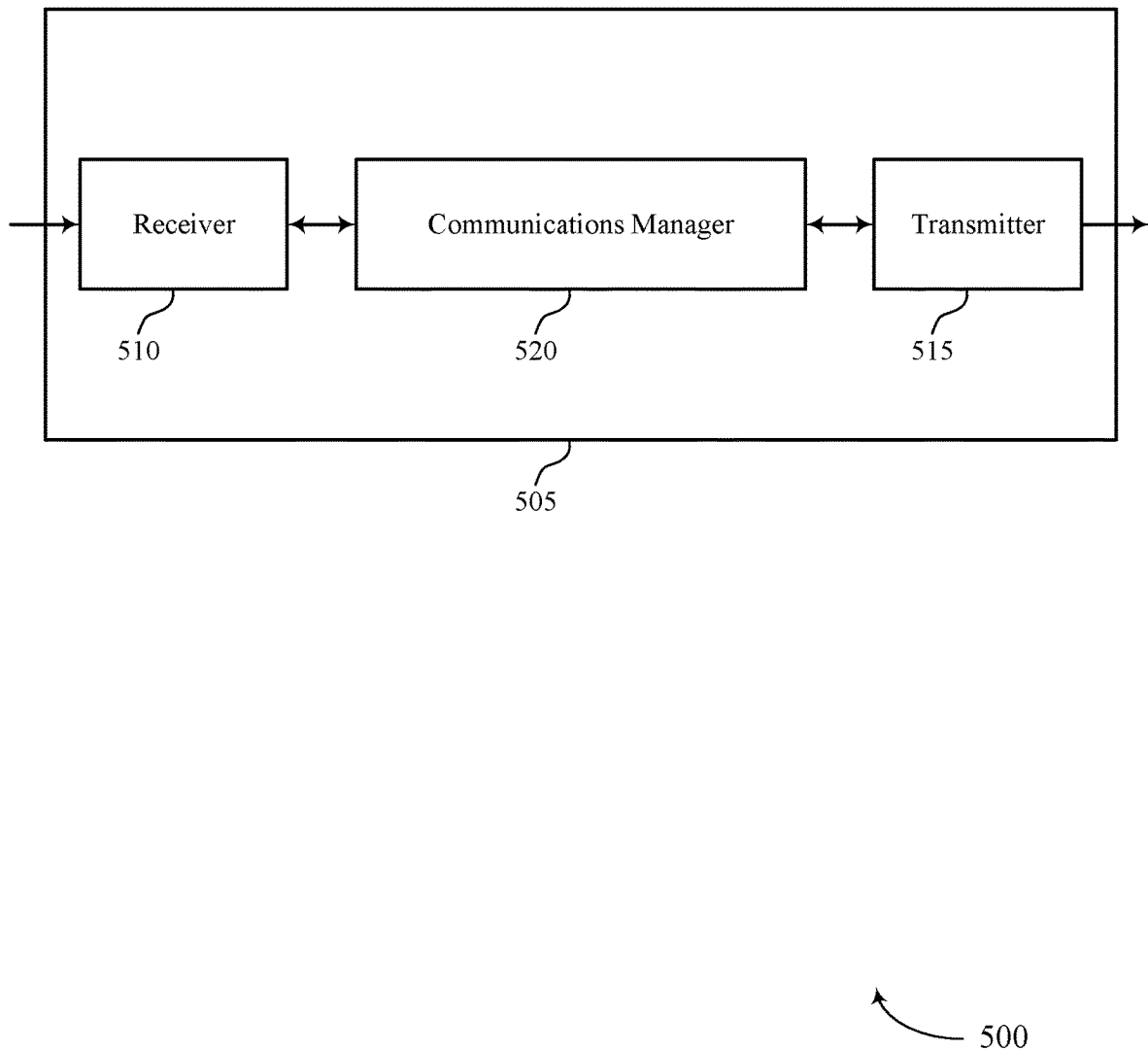
FIGS. 5 and 6 show block diagrams of devices in accordance with aspects of the present disclosure.

FIG. 5 shows a block diagram 500 of a device 505 that supports power control in serving cell with neighboring cells operating in different direction or full-duplex mode in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power control in serving cell with neighboring cells operating in different direction or full-duplex mode). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power control in serving cell with neighboring cells operating in different direction or full-duplex mode). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of power control in serving cell with neighboring cells operating in different direction or full-duplex mode as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication by a UE in accordance with examples as disclosed herein. For example, the communications manager 520 may be configured as or otherwise support a means for receiving control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band. The communications manager 520 may be configured as or otherwise support a means for selecting one of the first power control configuration or the second power control configuration based on a first TTI format of the serving base station and a second TTI format of the neighbor base station corresponding to a first TTI for transmission of an uplink message. The communications manager 520 may be configured as or otherwise support a means for transmitting the uplink message during the first TTI in accordance with the selected power control configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for flexible power control of uplink transmissions to reduce interference with neighboring devices and cells. Adapting power control based on the direction of communications of a neighboring cell may increase reliability of transmissions at the device 505 (e.g., due to the reduced interference), which may in turn reduce power consumption of the device 505. Additionally, the device 505 may more efficiently utilize communications resources, as the increased reliability may reduce the quantity of retransmissions performed at the device 505.

Figure 6:
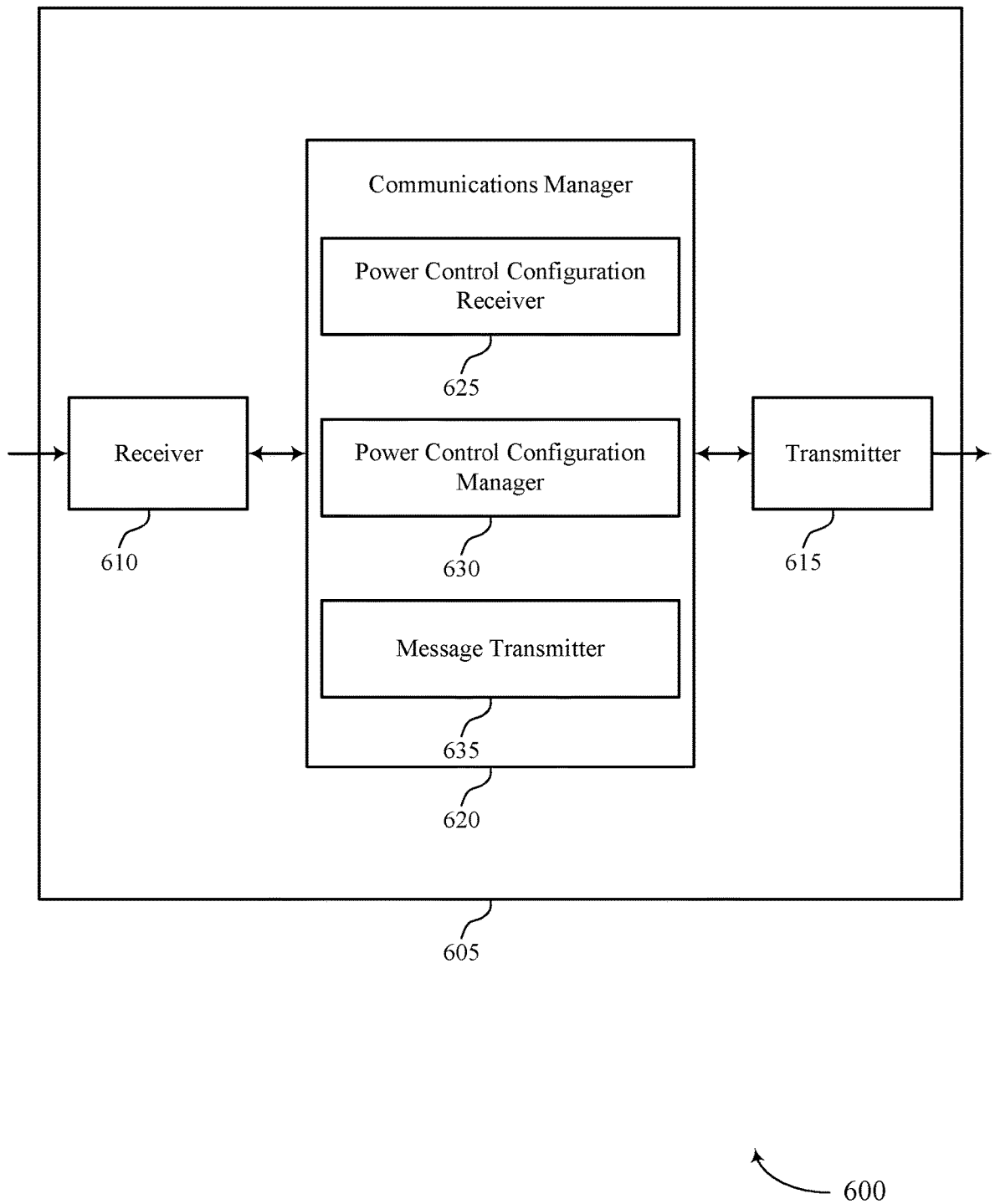

FIG. 6 shows a block diagram 600 of a device 605 that supports power control in serving cell with neighboring cells operating in different direction or full-duplex mode in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to power control in serving cell with neighboring cells operating in different direction or full-duplex mode). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power control in serving cell with neighboring cells operating in different direction or full-duplex mode). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of power control in serving cell with neighboring cells operating in different direction or full-duplex mode as described herein. For example, the communications manager 620 may include a power control configuration receiver 625, a power control configuration manager 630, a message transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication by a UE in accordance with examples as disclosed herein. The power control configuration receiver 625 may be configured as or otherwise support a means for receiving control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band. The power control configuration manager 630 may be configured as or otherwise support a means for selecting one of the first power control configuration or the second power control configuration based on a first TTI format of the serving base station and a second TTI format of the neighbor station corresponding to a first TTI for transmission of an uplink message. The message transmitter 635 may be configured as or otherwise support a means for transmitting the uplink message during the first TTI in accordance with the selected power control configuration.

Figure 7:
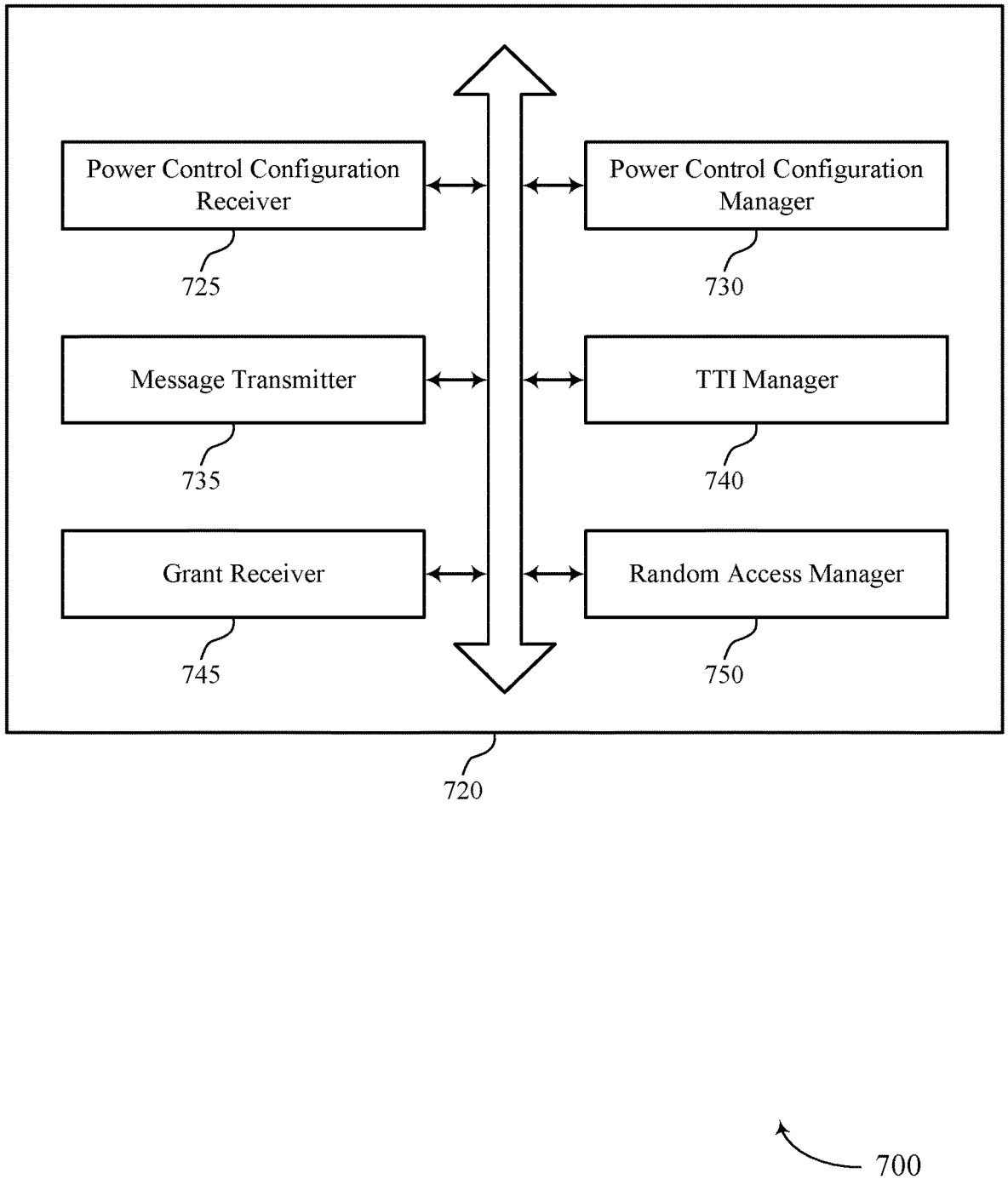
FIG. 7 shows a block diagram of a communications manager in accordance with aspects of the present disclosure.

FIG. 7 shows a block diagram 700 of a communications manager 720 that supports power control in serving cell with neighboring cells operating in different direction or full-duplex mode in accordance with aspects of the present disclosure. The communications manager 720 may be an example of aspects of a communications manager 520, a communications manager 620, or both, as described herein. The communications manager 720, or various components thereof, may be an example of means for performing various aspects of power control in serving cell with neighboring cells operating in different direction or full-duplex mode as described herein. For example, the communications manager 720 may include a power control configuration receiver 725, a power control configuration manager 730, a message transmitter 735, a TTI manager 740, a grant receiver 745, a random access manager 750, or any combination thereof. Each of these components may communicate, directly or indirectly, with one another (e.g., via one or more buses).

The communications manager 720 may support wireless communication by a UE in accordance with examples as disclosed herein. The power control configuration receiver 725 may be configured as or otherwise support a means for receiving control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band. The power control configuration manager 730 may be configured as or otherwise support a means for selecting one of the first power control configuration or the second power control configuration based on a first TTI format of the serving base station and a second TTI format of the neighbor station corresponding to a first TTI for transmission of an uplink message. The message transmitter 735 may be configured as or otherwise support a means for transmitting the uplink message during the first TTI in accordance with the selected power control configuration.

In some examples, to support receiving the control signaling, the TTI manager 740 may be configured as or otherwise support a means for receiving the control signaling indicating the first TTI format, the second TTI format, or both.

In some examples, the grant receiver 745 may be configured as or otherwise support a means for receiving a grant scheduling transmission of the uplink message in the first TTI, where the grant indicates one of the first power control configuration or the second power control configuration.

In some examples, to support receiving the grant, the grant receiver 745 may be configured as or otherwise support a means for receiving the grant including a transmit power command indicating one of the first power control configuration or the second power control configuration.

In some examples, the transmit power command includes one or more bits indicating one of the first power control configuration or the second power control configuration.

In some examples, to support receiving the control signaling, the TTI manager 740 may be configured as or otherwise support a means for receiving, from the serving base station, first control signaling indicating the first TTI format. In some examples, to support receiving the control signaling, the TTI manager 740 may be configured as or otherwise support a means for receiving, from the neighbor base station, second control signaling indicating the second TTI format.

In some examples, the first control signaling indicating the first TTI format identifies a first path-loss exponent, a first power offset value, a first maximum power value, a first maximum power reduction value, or any combination thereof, and the second control signaling indicating the second power control configuration identifies a second path-loss exponent, a second power offset value, a second maximum power value, a second maximum power reduction value, or any combination thereof.

In some examples, to support receiving the control signaling, the power control configuration manager 730 may be configured as or otherwise support a means for receiving the control signaling indicating a configuration selection condition including a cell edge condition, a duplexing mode condition for the neighbor base station, a slot type condition, a beamforming condition, or any combination thereof, where one of the first power control configuration or the second power control configuration is selected based on the configuration selection condition.

In some examples, the power control configuration receiver 725 may be configured as or otherwise support a means for receiving a MAC-CE indicating one of the first power control configuration or the second power control configuration.

In some examples, the grant receiver 745 may be configured as or otherwise support a means for receiving a grant scheduling transmission of the uplink message in the first TTI.

In some examples, to support receiving the control signaling, the power control configuration manager 730 may be configured as or otherwise support a means for receiving the control signaling indicating the first power control configuration that identifies a first initial transmission power for the uplink message that is a random access message and a first power ramp value, and the second power control configuration that identifies a second initial transmission power for the random access message and a second power ramp value.

In some examples, the random access manager 750 may be configured as or otherwise support a means for monitoring for a random access response message based on transmitting the random access message. In some examples, the random access manager 750 may be configured as or otherwise support a means for transmitting a second random access message in accordance with the first power ramp value or the second power ramp value based on the monitoring.

Figure 8:
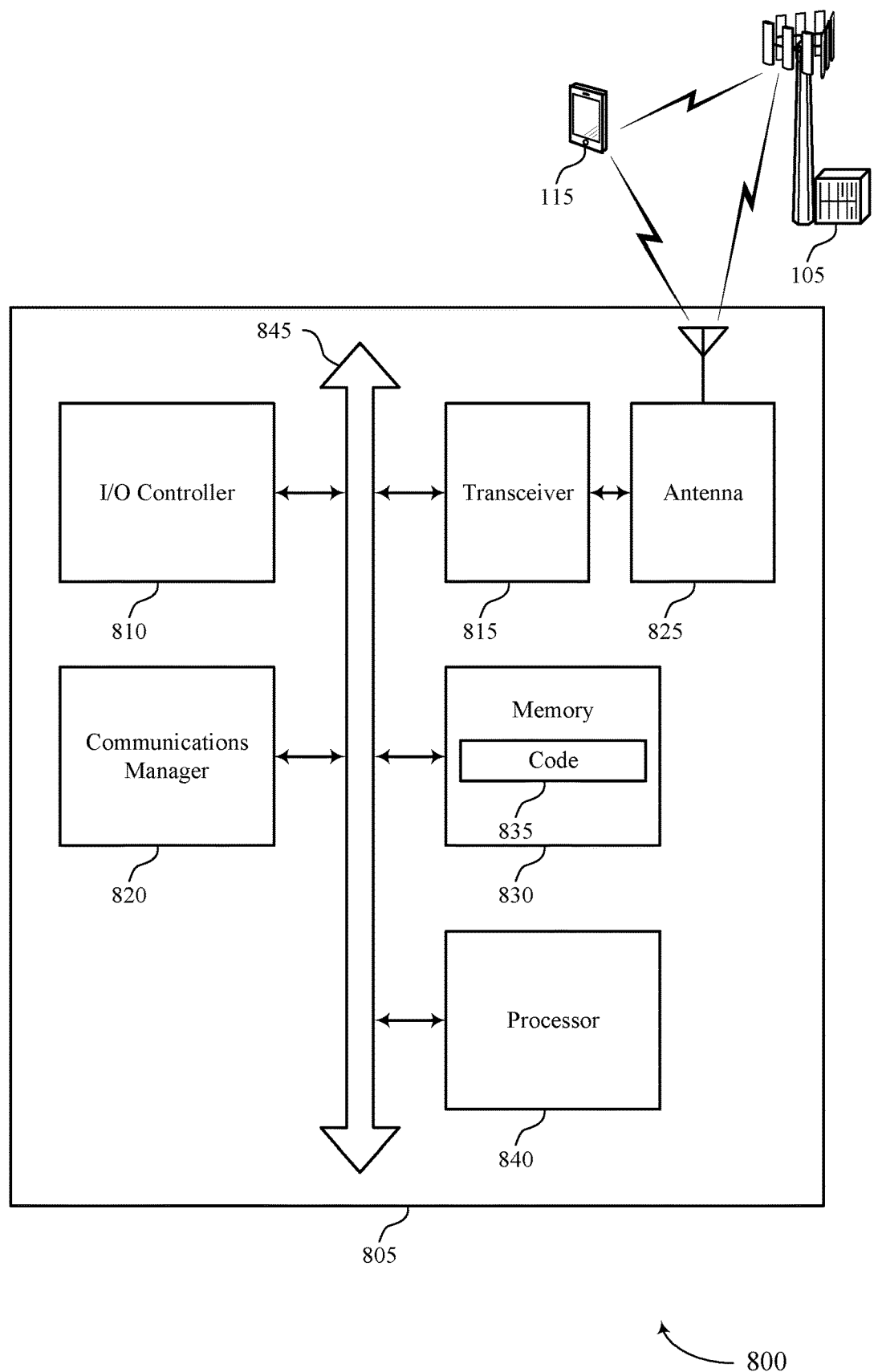
FIG. 8 shows a diagram of a system including a device in accordance with aspects of the present disclosure.

FIG. 8 shows a diagram of a system 800 including a device 805 that supports power control in serving cell with neighboring cells operating in different direction or full-duplex mode in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting power control in serving cell with neighboring cells operating in different direction or full-duplex mode). For example, the device 805 or a component of the device 805 may include a processor 840 and memory 830 coupled to the processor 840, the processor 840 and memory 830 configured to perform various functions described herein.

The communications manager 820 may support wireless communication by a UE in accordance with examples as disclosed herein. For example, the communications manager 820 may be configured as or otherwise support a means for receiving control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band. The communications manager 820 may be configured as or otherwise support a means for selecting one of the first power control configuration or the second power control configuration based on a first TTI format of the serving base station and a second TTI format of the neighbor station corresponding to a first TTI for transmission of an uplink message. The communications manager 820 may be configured as or otherwise support a means for transmitting the uplink message during the first TTI in accordance with the selected power control configuration.

By including or configuring the communications manager 820 in accordance with examples as described herein, the device 805 may support techniques for flexible power control of uplink transmissions to reduce interference with neighboring devices and cells. Adapting power control based on the direction of communications of a neighboring cell may increase communications reliability and decrease latency at the device 805, which may in turn reduce power consumption and improve user experience. For example, increased reliability and subsequently fewer retransmissions may increase battery life at the device 805.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of power control in serving cell with neighboring cells operating in different direction or full-duplex mode as described herein, or the processor 840 and the memory 830 may be otherwise configured to perform or support such operations.

Figure 9:
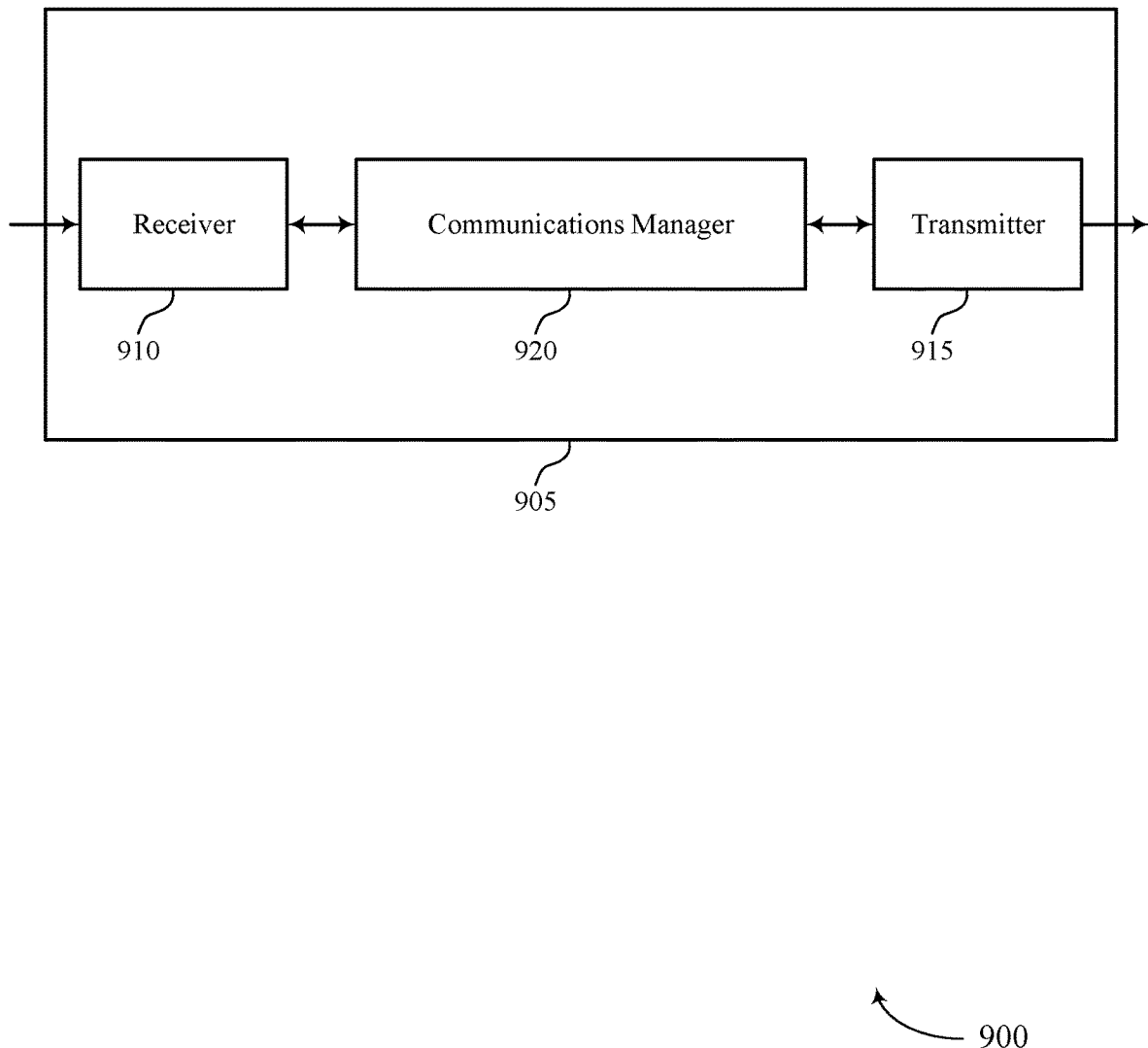
FIGS. 9 and 10 show block diagrams of devices in accordance with aspects of the present disclosure.

FIG. 9 shows a block diagram 900 of a device 905 that supports power control in serving cell with neighboring cells operating in different direction or full-duplex mode in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to power control in serving cell with neighboring cells operating in different direction or full-duplex mode). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to power control in serving cell with neighboring cells operating in different direction or full-duplex mode). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of power control in serving cell with neighboring cells operating in different direction or full-duplex mode as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a serving base station in accordance with examples as disclosed herein. For example, the communications manager 920 may be configured as or otherwise support a means for transmitting, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band. The communications manager 920 may be configured as or otherwise support a means for receiving an uplink message in accordance with one of the first power control configuration or the second power control configuration based on a first TTI format of the serving base station and a second TTI format of the neighbor station corresponding to a first TTI, where the uplink message is received during the first TTI.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for flexible power control of uplink transmissions to reduce interference with neighboring devices and cells. Enabling the device 905 to communicate in a direction different than a neighboring cell without increasing interference in the neighboring cell may reduce processing and power consumption at the device 905. For example, the device 905 may transmit or receive fewer overall retransmissions, as communications may be more reliable without conflicting interference.

Figure 10:
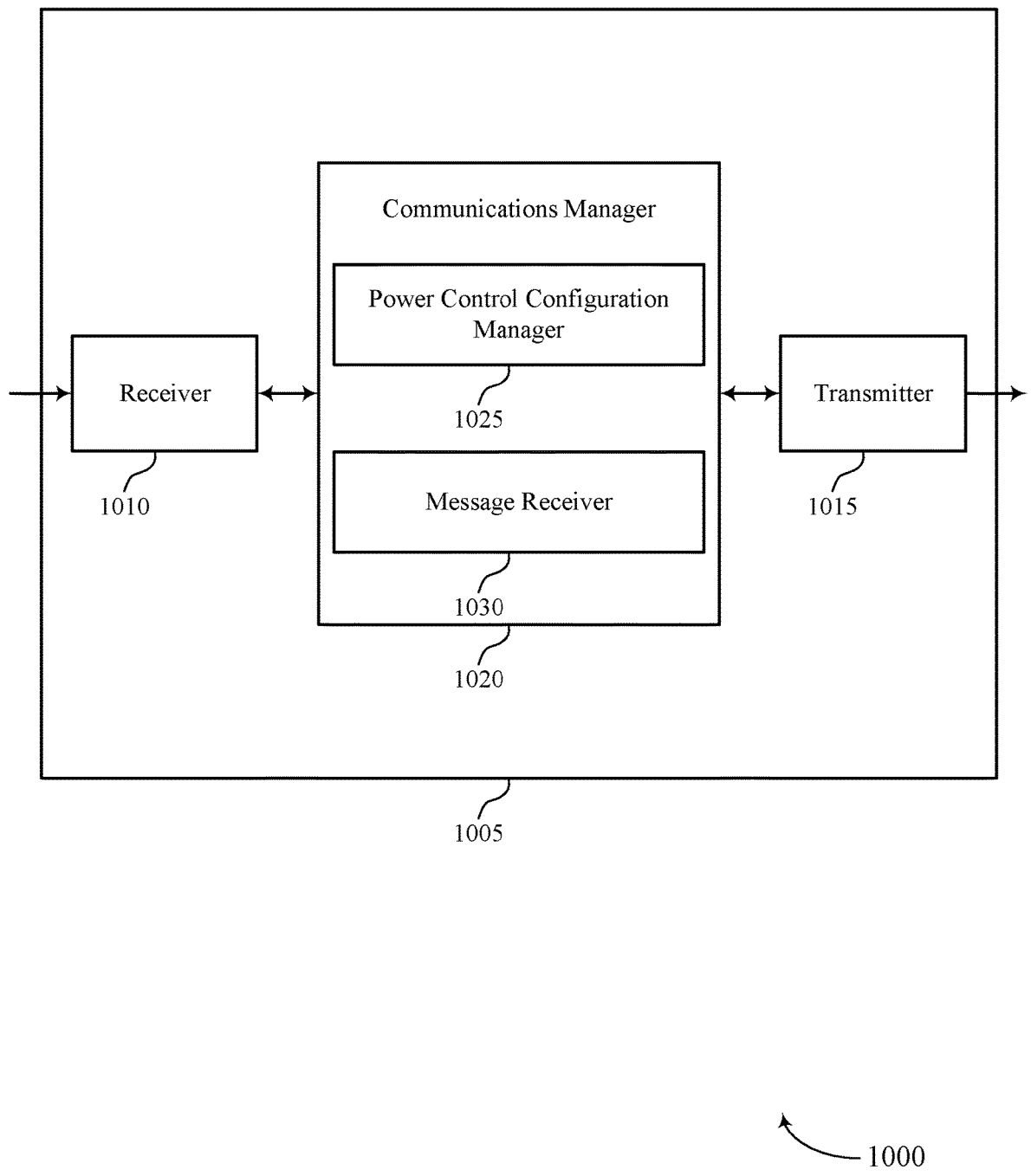

FIG. 10 shows a block diagram 1000 of a device 1005 that supports power control in serving cell with neighboring cells operating in different direction or full-duplex mode in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to power control in serving cell with neighboring cells operating in different direction or full-duplex mode). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to power control in serving cell with neighboring cells operating in different direction or full-duplex mode). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of power control in serving cell with neighboring cells operating in different direction or full-duplex mode as described herein. For example, the communications manager 1020 may include a power control configuration manager 1025 a message receiver 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a serving base station in accordance with examples as disclosed herein. The power control configuration manager 1025 may be configured as or otherwise support a means for transmitting, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band. The message receiver 1030 may be configured as or otherwise support a means for receiving an uplink message in accordance with one of the first power control configuration or the second power control configuration based on a first TTI format of the serving base station and a second TTI format of the neighbor station corresponding to a first TTI, where the uplink message is received during the first TTI.

Figure 11:
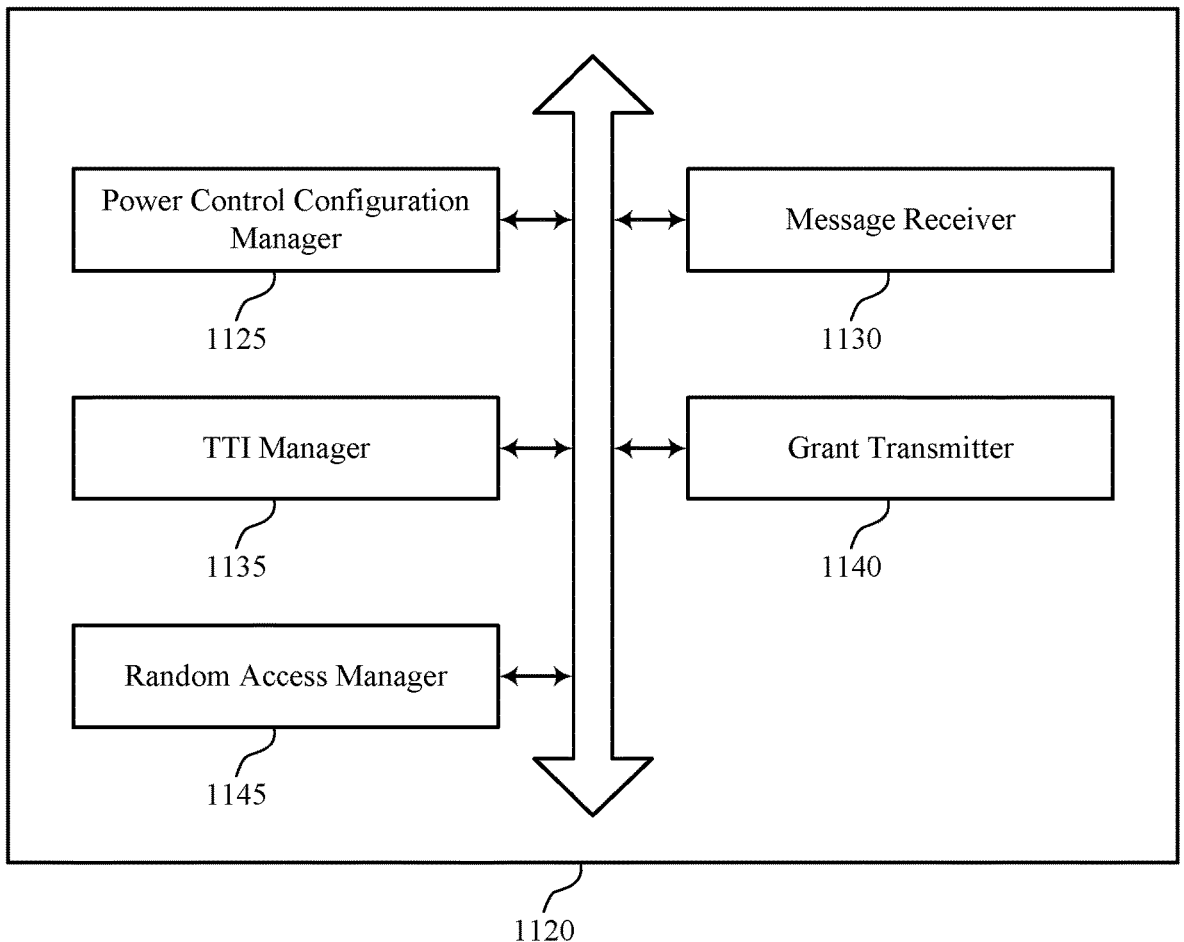
FIG. 11 shows a block diagram of a communications manager in accordance with aspects of the present disclosure.

FIG. 11 shows a block diagram 1100 of a communications manager 1120 that supports power control in serving cell with neighboring cells operating in different direction or full-duplex mode in accordance with aspects of the present disclosure. The communications manager 1120 may be an example of aspects of a communications manager 920, a communications manager 1020, or both, as described herein. The communications manager 1120, or various components thereof, may be an example of means for performing various aspects of power control in serving cell with neighboring cells operating in different direction or full-duplex mode as described herein. For example, the communications manager 1120 may include a power control configuration manager 1125, a message receiver 1130, a TTI manager 1135, a grant transmitter 1140, a random access manager 1145, or any combination thereof. Each of these components may communicate, directly or indirectly, with one another (e.g., via one or more buses).

The communications manager 1120 may support wireless communication at a serving base station in accordance with examples as disclosed herein. The power control configuration manager 1125 may be configured as or otherwise support a means for transmitting, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band. The message receiver 1130 may be configured as or otherwise support a means for receiving an uplink message in accordance with one of the first power control configuration or the second power control configuration based on a first TTI format of the serving base station and a second TTI format of the neighbor station corresponding to a first TTI, where the uplink message is received during the first TTI.

In some examples, to support transmitting the control signaling, the TTI manager 1135 may be configured as or otherwise support a means for transmitting the control signaling indicating the first TTI format, the second TTI format, or both.

In some examples, the grant transmitter 1140 may be configured as or otherwise support a means for transmitting a grant scheduling transmission of the uplink message in the first TTI, where the grant indicates one of the first power control configuration or the second power control configuration.

In some examples, to support receiving the grant, the grant transmitter 1140 may be configured as or otherwise support a means for transmitting the grant including a transmit power command indicating one of the first power control configuration or the second power control configuration.

In some examples, the transmit power command includes one or more bits indicating one of the first power control configuration or the second power control configuration.

In some examples, transmitting the control signaling includes transmitting control signaling indicating the first TTI format.

In some examples, the control signaling indicating the first TTI format identifies a path-loss exponent, a power offset value, a maximum power value, a maximum power reduction value, or any combination thereof.

In some examples, to support transmitting the control signaling, the power control configuration manager 1125 may be configured as or otherwise support a means for transmitting the control signaling indicating a configuration selection condition including a cell edge condition, a duplexing mode condition for the neighbor base station, a slot type condition, a beamforming condition, or any combination thereof.

In some examples, the power control configuration manager 1125 may be configured as or otherwise support a means for transmitting a media access control element (MAC-CE) indicating one of the first power control configuration or the second power control configuration.

In some examples, the grant transmitter 1140 may be configured as or otherwise support a means for transmitting a grant scheduling transmission of the uplink message in the first TTI.

In some examples, to support transmitting the control signaling, the power control configuration manager 1125 may be configured as or otherwise support a means for transmitting the control signaling indicating the first power control configuration that identifies a first initial transmission power for the uplink message that is a random access message and a first power ramp value, and the second power control configuration that identifies a second initial transmission power for the random access message and a second power ramp value.

In some examples, the random access manager 1145 may be configured as or otherwise support a means for transmitting a random access response message based on receiving the random access message. In some examples, the random access manager 1145 may be configured as or otherwise support a means for receiving a second random access message in accordance with the first power ramp value or the second power ramp value based on the transmitting.

Figure 12:
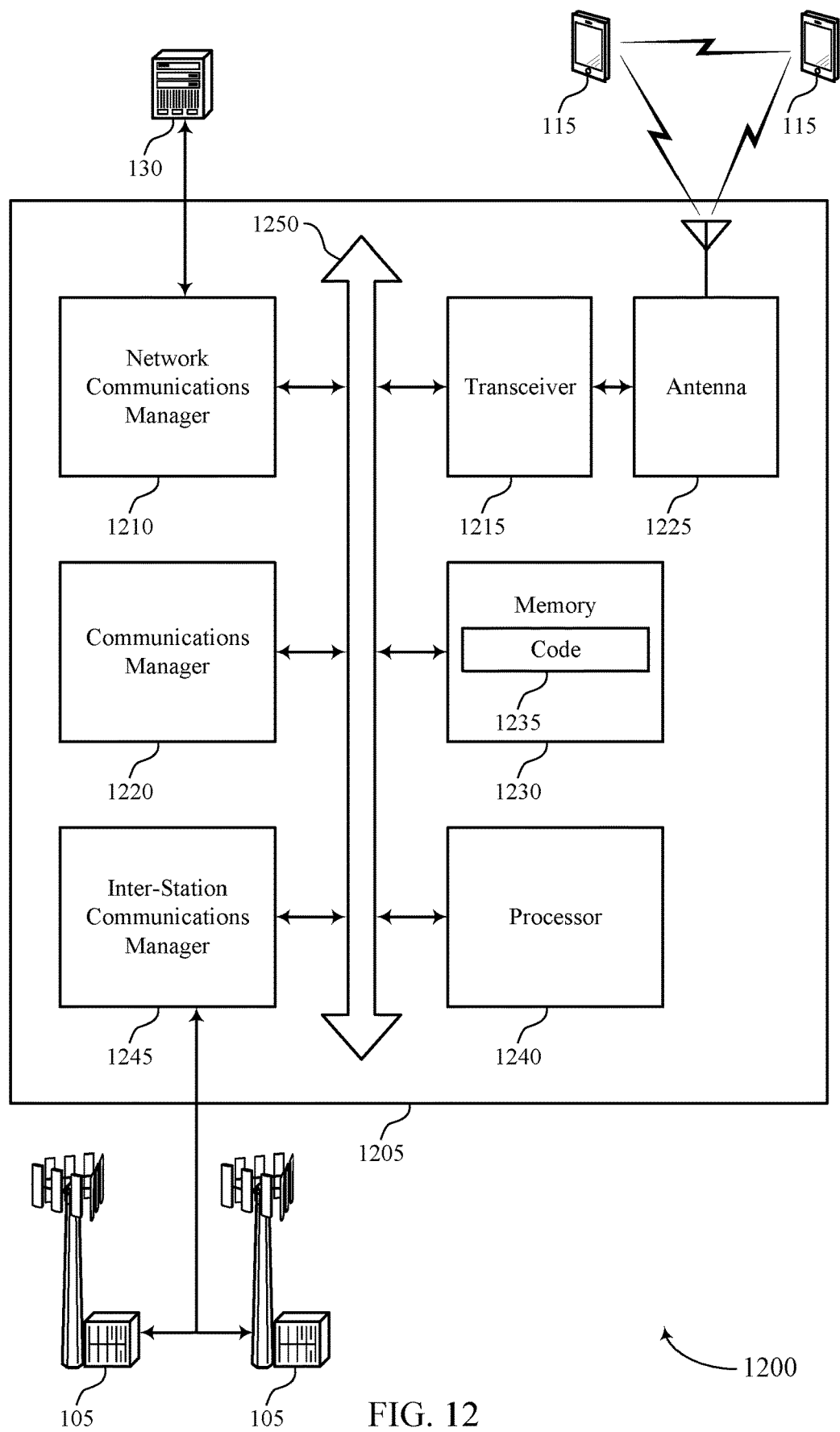
FIG. 12 shows a diagram of a system including a device in accordance with aspects of the present disclosure.

FIG. 12 shows a diagram of a system 1200 including a device 1205 that supports power control in serving cell with neighboring cells operating in different direction or full-duplex mode in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting power control in serving cell with neighboring cells operating in different direction or full-duplex mode). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a serving base station in accordance with examples as disclosed herein. For example, the communications manager 1220 may be configured as or otherwise support a means for transmitting, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band. The communications manager 1220 may be configured as or otherwise support a means for receiving an uplink message in accordance with one of the first power control configuration or the second power control configuration based on a first TTI format of the serving base station and a second TTI format of the neighbor station corresponding to a first TTI, where the uplink message is received during the first TTI.

By including or configuring the communications manager 1220 in accordance with examples as described herein, the device 1205 may support techniques for flexible power control of uplink transmissions to reduce interference with neighboring devices and cells. For example, the device 1205 may receive uplink transmissions in a slot that is associated with reduced latency according to a power control configuration that reduces or avoids introducing interference. Avoiding interference and latency may further increase communications efficiency and reliability at the device 1205 and in the system.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of power control in serving cell with neighboring cells operating in different direction or full-duplex mode as described herein, or the processor 1240 and the memory 1230 may be otherwise configured to perform or support such operations.

Figure 13:
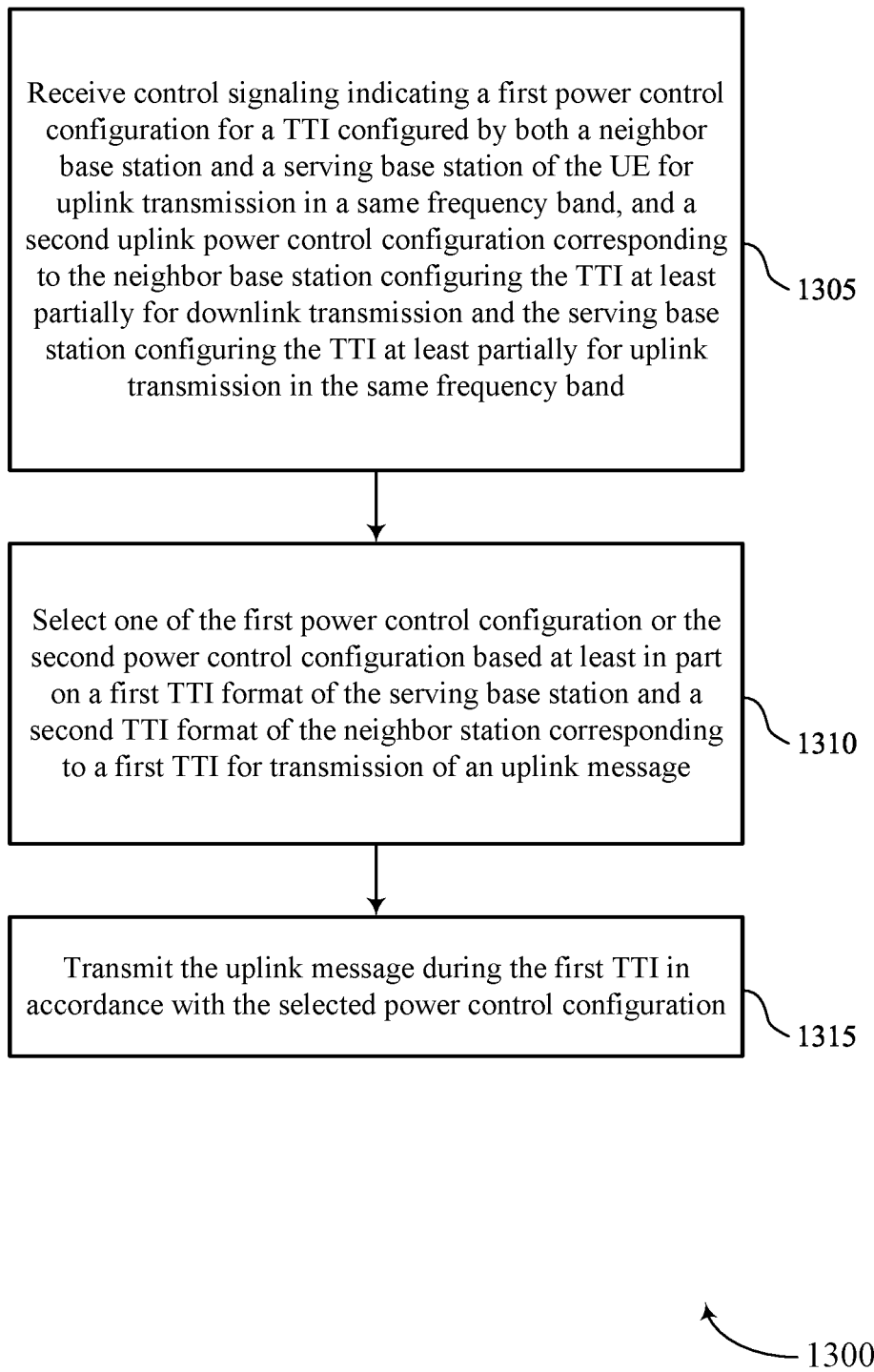
FIGS. 13 through 16 show flowcharts illustrating methods that support power control in serving cell with neighboring cells operating in different direction or full-duplex mode in accordance with aspects of the present disclosure.

FIG. 13 shows a flowchart illustrating a method 1300 that supports power control in serving cell with neighboring cells operating in different direction or full-duplex mode in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band. The operations of 1305 may be performed in accordance with examples as disclosed herein. In some examples, aspects of the operations of 1305 may be performed by a power control configuration receiver 725 as described with reference to FIG. 7.

At 1310, the method may include selecting one of the first power control configuration or the second power control configuration based on a first TTI format of the serving base station and a second TTI format of the neighbor station corresponding to a first TTI for transmission of an uplink message. The operations of 1310 may be performed in accordance with examples as disclosed herein. In some examples, aspects of the operations of 1310 may be performed by a power control configuration manager 730 as described with reference to FIG. 7.

At 1315, the method may include transmitting the uplink message during the first TTI in accordance with the selected power control configuration. The operations of 1315 may be performed in accordance with examples as disclosed herein. In some examples, aspects of the operations of 1315 may be performed by a message transmitter 735 as described with reference to FIG. 7.

Figure 14:
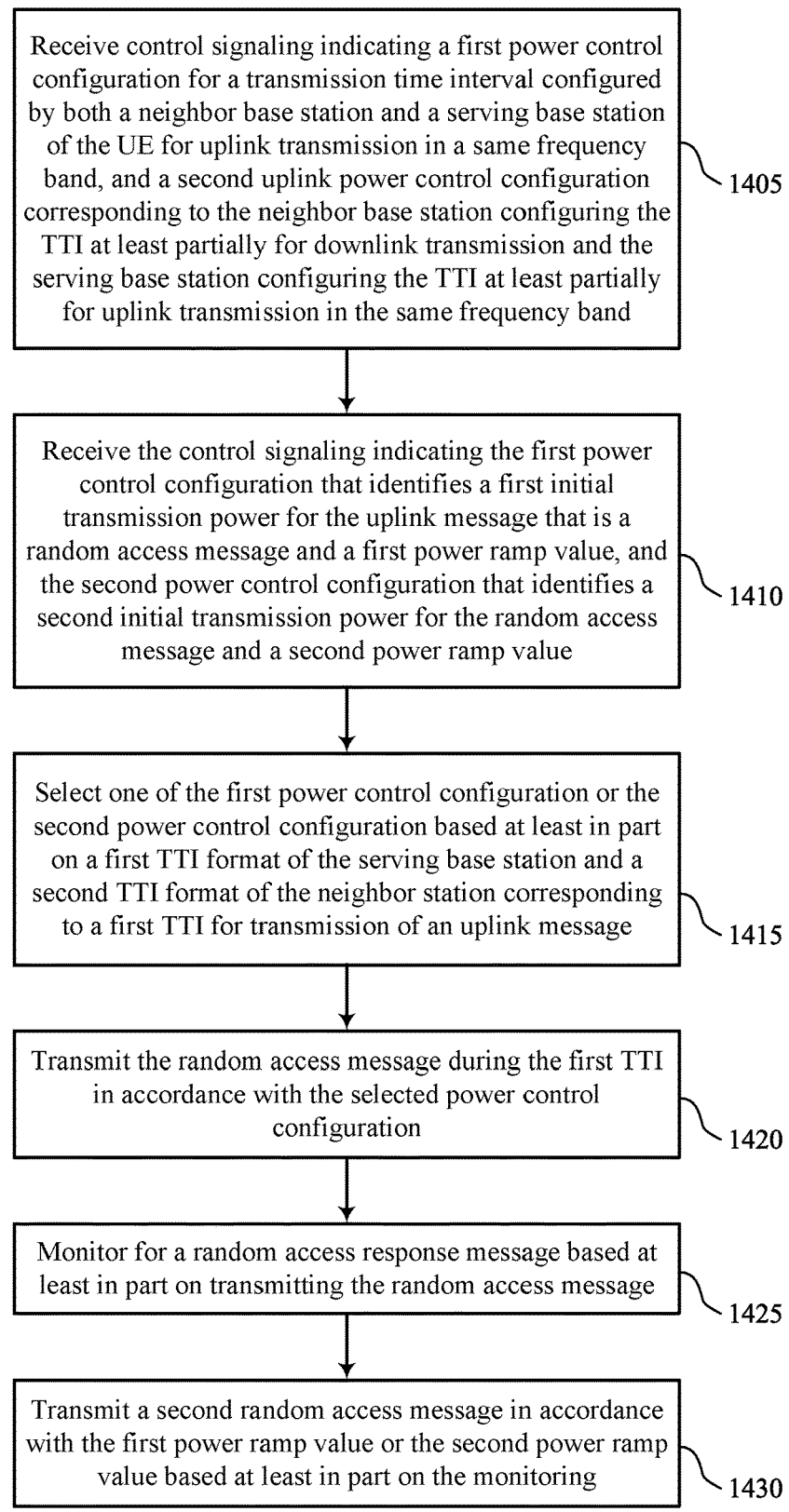

FIG. 14 shows a flowchart illustrating a method 1400 that supports power control in serving cell with neighboring cells operating in different direction or full-duplex mode in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band. The operations of 1405 may be performed in accordance with examples as disclosed herein. In some examples, aspects of the operations of 1405 may be performed by a power control configuration receiver 725 as described with reference to FIG. 7.

At 1410, the method may include receiving the control signaling indicating the first power control configuration that identifies a first initial transmission power for the uplink message that is a random access message and a first power ramp value, and the second power control configuration that identifies a second initial transmission power for the random access message and a second power ramp value. The operations of 1410 may be performed in accordance with examples as disclosed herein. In some examples, aspects of the operations of 1410 may be performed by a power control configuration manager 730 as described with reference to FIG. 7.

At 1415, the method may include selecting one of the first power control configuration or the second power control configuration based on a first TTI format of the serving base station and a second TTI format of the neighbor station corresponding to a first TTI for transmission of an uplink message. The operations of 1415 may be performed in accordance with examples as disclosed herein. In some examples, aspects of the operations of 1415 may be performed by a power control configuration manager 730 as described with reference to FIG. 7.

At 1420, the method may include transmitting the uplink message during the first TTI in accordance with the selected power control configuration. The operations of 1420 may be performed in accordance with examples as disclosed herein. In some examples, aspects of the operations of 1420 may be performed by a message transmitter 735 as described with reference to FIG. 7.

At 1425, the method may include monitoring for a random access response message based on transmitting the random access message. The operations of 1425 may be performed in accordance with examples as disclosed herein. In some examples, aspects of the operations of 1425 may be performed by a random access manager 750 as described with reference to FIG. 7.

At 1430, the method may include transmitting a second random access message in accordance with the first power ramp value or the second power ramp value based on the monitoring. The operations of 1430 may be performed in accordance with examples as disclosed herein. In some examples, aspects of the operations of 1430 may be performed by a random access manager 750 as described with reference to FIG. 7.

Figure 15:
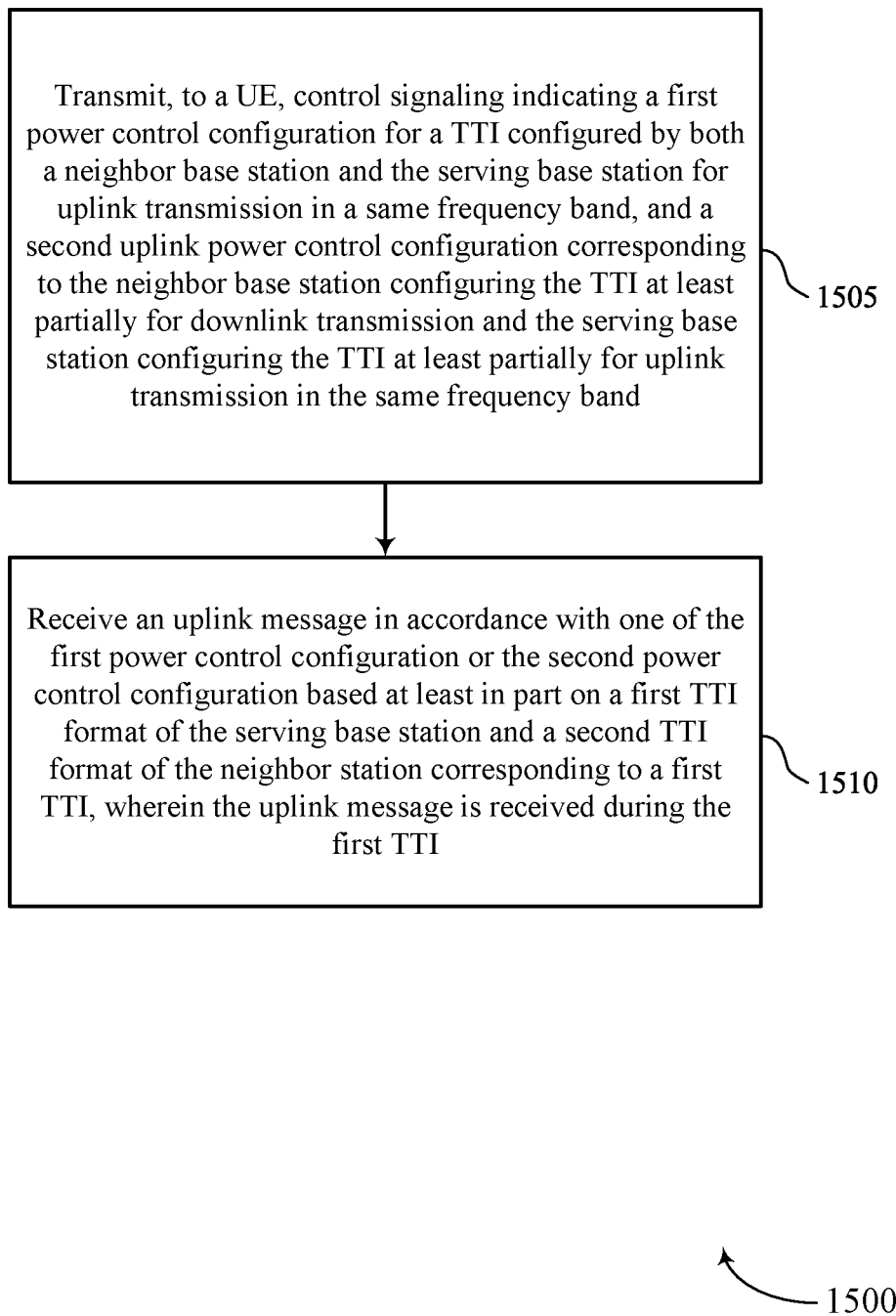

FIG. 15 shows a flowchart illustrating a method 1500 that supports power control in serving cell with neighboring cells operating in different direction or full-duplex mode in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band. The operations of 1505 may be performed in accordance with examples as disclosed herein. In some examples, aspects of the operations of 1505 may be performed by a power control configuration manager 1125 as described with reference to FIG. 11.

At 1510, the method may include receiving an uplink message in accordance with one of the first power control configuration or the second power control configuration based on a first TTI format of the serving base station and a second TTI format of the neighbor station corresponding to a first TTI, where the uplink message is received during the first TTI. The operations of 1510 may be performed in accordance with examples as disclosed herein. In some examples, aspects of the operations of 1510 may be performed by a message receiver 1130 as described with reference to FIG. 11.

Figure 16:
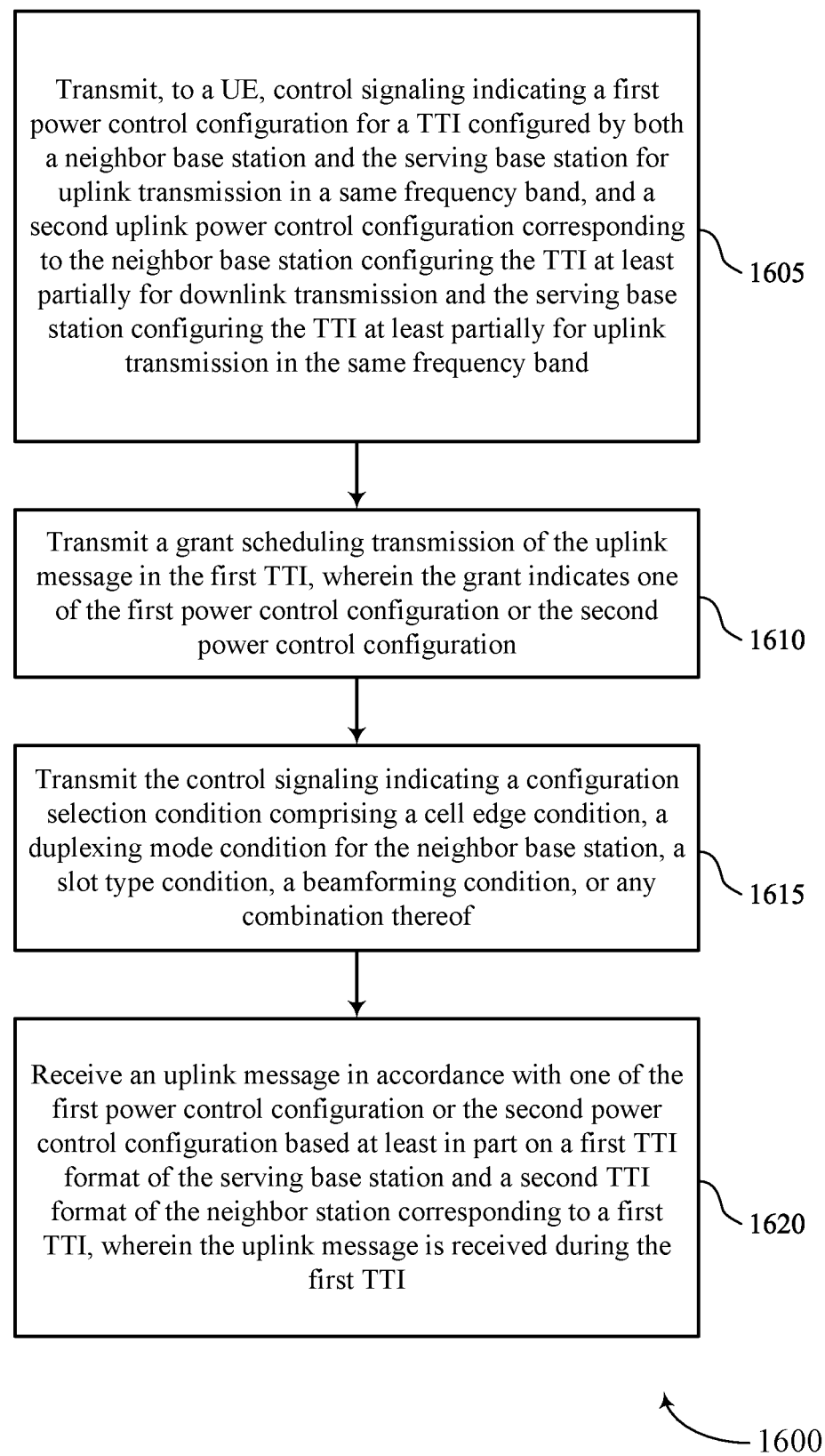

FIG. 16 shows a flowchart illustrating a method 1600 that supports power control in serving cell with neighboring cells operating in different direction or full-duplex mode in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band. The operations of 1605 may be performed in accordance with examples as disclosed herein. In some examples, aspects of the operations of 1605 may be performed by a power control configuration manager 1125 as described with reference to FIG. 11.

At 1610, the method may include transmitting a grant scheduling transmission of the uplink message in the first TTI, where the grant indicates one of the first power control configuration or the second power control configuration. The operations of 1610 may be performed in accordance with examples as disclosed herein. In some examples, aspects of the operations of 1610 may be performed by a grant transmitter 1140 as described with reference to FIG. 11.

At 1615, the method may include transmitting the control signaling indicating a configuration selection condition including a cell edge condition, a duplexing mode condition for the neighbor base station, a slot type condition, a beamforming condition, or any combination thereof. The operations of 1615 may be performed in accordance with examples as disclosed herein. In some examples, aspects of the operations of 1615 may be performed by a power control configuration manager 1125 as described with reference to FIG. 11.

At 1620, the method may include receiving an uplink message in accordance with one of the first power control configuration or the second power control configuration based on a first TTI format of the serving base station and a second TTI format of the neighbor station corresponding to a first TTI, where the uplink message is received during the first TTI. The operations of 1620 may be performed in accordance with examples as disclosed herein. In some examples, aspects of the operations of 1620 may be performed by a message receiver 1130 as described with reference to FIG. 11.

The following provides an overview of aspects of the present disclosure:

Aspect 1: A method for wireless communication by a UE, comprising: receiving control signaling indicating a first power control configuration for a TTI configured by both a neighbor base station and a serving base station of the UE for uplink transmission in a same frequency band, and a second uplink power control configuration corresponding to the neighbor base station configuring the TTI at least partially for downlink transmission and the serving base station configuring the TTI at least partially for uplink transmission in the same frequency band; selecting one of the first power control configuration or the second power control configuration based at least in part on a first TTI format of the serving base station and a second TTI format of the neighbor station corresponding to a first TTI for transmission of an uplink message; and transmitting the uplink message during the first TTI in accordance with the selected power control configuration.

Aspect 2: The method of aspect 1, wherein receiving the control signaling comprises: receiving the control signaling indicating the first TTI format, the second TTI format, or both.

Aspect 3: The method of any of aspects 1 through 2, further comprising: receiving a grant scheduling transmission of the uplink message in the first TTI, wherein the grant indicates one of the first power control configuration or the second power control configuration.

Aspect 4: The method of aspect 3, wherein receiving the grant comprises: receiving the grant comprising a transmit power command indicating one of the first power control configuration or the second power control configuration.

Aspect 5: The method of aspect 4, wherein the transmit power command comprises one or more bits indicating one of the first power control configuration or the second power control configuration.

Aspect 6: The method of any of aspects 1 through 5, wherein receiving the control signaling comprises: receiving, from the serving base station, first control signaling indicating the first TTI format; and receiving, from the neighbor base station, second control signaling indicating the second TTI format.

Aspect 7: The method of aspect 6, wherein the first control signaling indicating the first TTI format identifies a first path-loss exponent, a first power offset value, a first maximum power value, a first maximum power reduction value, or any combination thereof, and the second control signaling indicating the second power control configuration identifies a second path-loss exponent, a second power offset value, a second maximum power value, a second maximum power reduction value, or any combination thereof.

Aspect 8: The method of any of aspects 1 through 7, wherein receiving the control signaling comprises: receiving the control signaling indicating a configuration selection condition comprising a cell edge condition, a duplexing mode condition for the neighbor base station, a slot type condition, a beamforming condition, or any combination thereof, wherein one of the first power control configuration or the second power control configuration is selected based at least in part on the configuration selection condition.

Aspect 9: The method of any of aspects 1 through 8, further comprising: receiving a MAC-CE indicating one of the first power control configuration or the second power control configuration.

Aspect 10: The method of any of aspects 1 through 9, further comprising: receiving a grant scheduling transmission of the uplink message in the first TTI.

Aspect 11: The method of any of aspects 1 through 10, wherein receiving the control signaling comprises: receiving the control signaling indicating the first power control configuration that identifies a first initial transmission power for the uplink message that is a random access message and a first power ramp value, and the second power control configuration that identifies a second initial transmission power for the random access message and a second power ramp value.

Aspect 12: The method of aspect 11, further comprising: monitoring for a random access response message based at least in part on transmitting the random access message; and transmitting a second random access message in accordance with the first power ramp value or the second power ramp value based at least in part on the monitoring.

Aspect 13: A method for wireless communication at a serving base station, comprising: transmitting, to a UE, control signaling indicating a first power control configuration for a TTI configured by both a neighbor base station and the serving base station for uplink transmission in a same frequency band, and a second uplink power control configuration corresponding to the neighbor base station configuring the TTI at least partially for downlink transmission and the serving base station configuring the TTI at least partially for uplink transmission in the same frequency band; and receiving an uplink message in accordance with one of the first power control configuration or the second power control configuration based at least in part on a first TTI format of the serving base station and a second TTI format of the neighbor station corresponding to a first TTI, wherein the uplink message is received during the first TTI.

Aspect 14: The method of aspect 13, wherein transmitting the control signaling comprises: transmitting the control signaling indicating the first TTI format, the second TTI format, or both.

Aspect 15: The method of any of aspects 13 through 14, further comprising: transmitting a grant scheduling transmission of the uplink message in the first TTI, wherein the grant indicates one of the first power control configuration or the second power control configuration.

Aspect 16: The method of aspect 15, wherein receiving the grant comprises: transmitting the grant comprising a transmit power command indicating one of the first power control configuration or the second power control configuration.

Aspect 17: The method of aspect 16, wherein the transmit power command comprises one or more bits indicating one of the first power control configuration or the second power control configuration.

Aspect 18: The method of any of aspects 13 through 17, wherein transmitting the control signaling comprises transmitting control signaling indicating the first TTI format.

Aspect 19: The method of aspect 18, wherein the control signaling indicating the first TTI format identifies a path-loss exponent, a power offset value, a maximum power value, a maximum power reduction value, or any combination thereof.

Aspect 20: The method of any of aspects 13 through 19, wherein transmitting the control signaling comprises: transmitting the control signaling indicating a configuration selection condition comprising a cell edge condition, a duplexing mode condition for the neighbor base station, a slot type condition, a beamforming condition, or any combination thereof.

Aspect 21: The method of any of aspects 13 through 20, further comprising: transmitting a MAC-CE indicating one of the first power control configuration or the second power control configuration.

Aspect 22: The method of any of aspects 13 through 21, further comprising: transmitting a grant scheduling transmission of the uplink message in the first TTI.

Aspect 23: The method of any of aspects 13 through 22, wherein transmitting the control signaling comprises: transmitting the control signaling indicating the first power control configuration that identifies a first initial transmission power for the uplink message that is a random access message and a first power ramp value, and the second power control configuration that identifies a second initial transmission power for the random access message and a second power ramp value.

Aspect 24: The method of aspect 23, further comprising: transmitting a random access response message based at least in part on receiving the random access message; and receiving a second random access message in accordance with the first power ramp value or the second power ramp value based at least in part on the transmitting.

Aspect 25: An apparatus for wireless communication by a UE, comprising a processor; memory coupled with the processor; and instructions stored in the memory and executable by the processor to cause the apparatus to perform a method of any of aspects 1 through 12.

Aspect 26: An apparatus for wireless communication by a UE, comprising at least one means for performing a method of any of aspects 1 through 12.

Aspect 27: A non-transitory computer-readable medium storing code for wireless communication by a UE, the code comprising instructions executable by a processor to perform a method of any of aspects 1 through 12.

Aspect 28: An apparatus for wireless communication at a serving base station, comprising a processor; memory coupled with the processor; and instructions stored in the memory and executable by the processor to cause the apparatus to perform a method of any of aspects 13 through 24.

Aspect 29: An apparatus for wireless communication at a serving base station, comprising at least one means for performing a method of any of aspects 13 through 24.

Aspect 30: A non-transitory computer-readable medium storing code for wireless communication at a serving base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication by a user equipment (UE), comprising:
    receiving control signaling indicating a first power control configuration for a transmission time interval configured by both a neighbor base station and a serving base station of the UE for uplink transmission in a same frequency band, and a second power control configuration corresponding to the neighbor base station configuring the transmission time interval at least partially for downlink transmission and the serving base station configuring the transmission time interval at least partially for uplink transmission in the same frequency band;
    selecting one of the first power control configuration or the second power control configuration based at least in part on a first transmission time interval format of the serving base station and a second transmission time interval format of the neighbor base station corresponding to a first transmission time interval for transmission of an uplink message; and
    transmitting the uplink message during the first transmission time interval in accordance with the selected power control configuration.

2. The method of claim 1, wherein receiving the control signaling comprises:
    receiving the control signaling indicating the first transmission time interval format, the second transmission time interval format, or both.

3. The method of claim 1, further comprising:
    receiving a grant scheduling transmission of the uplink message in the first transmission time interval, wherein the grant indicates one of the first power control configuration or the second power control configuration.

4. The method of claim 3, wherein receiving the grant comprises:
    receiving the grant comprising a transmit power command indicating one of the first power control configuration or the second power control configuration.

5. The method of claim 4, wherein the transmit power command comprises one or more bits indicating one of the first power control configuration or the second power control configuration.

6. The method of claim 1, wherein receiving the control signaling comprises:
    receiving, from the serving base station, first control signaling indicating the first transmission time interval format; and
    receiving, from the neighbor base station, second control signaling indicating the second transmission time interval format.

7. The method of claim 6, wherein the first control signaling indicating the first transmission time interval format identifies a first path-loss exponent, a first power offset value, a first maximum power value, a first maximum power reduction value, or any combination thereof, and the second control signaling indicating the second power control configuration identifies a second path-loss exponent, a second power offset value, a second maximum power value, a second maximum power reduction value, or any combination thereof.

8. The method of claim 1, wherein receiving the control signaling comprises:
    receiving the control signaling indicating a configuration selection condition comprising a cell edge condition, a duplexing mode condition for the neighbor base station, a slot type condition, a beamforming condition, or any combination thereof, wherein one of the first power control configuration or the second power control configuration is selected based at least in part on the configuration selection condition.

9. The method of claim 1, further comprising:
receiving a media access control element (MAC-CE) indicating one of the first power control configuration or the second power control configuration.

10. The method of claim 1, further comprising:
receiving a grant scheduling transmission of the uplink message in the first transmission time interval.

11. The method of claim 1, wherein receiving the control signaling comprises:
receiving the control signaling indicating the first power control configuration that identifies a first initial transmission power for the uplink message that is a random access message and a first power ramp value, and the second power control configuration that identifies a second initial transmission power for the random access message and a second power ramp value.

12. The method of claim 11, further comprising:
monitoring for a random access response message based at least in part on transmitting the random access message; and
transmitting a second random access message in accordance with the first power ramp value or the second power ramp value based at least in part on the monitoring.

13. A method for wireless communication at a serving base station, comprising:
transmitting, to a user equipment (UE), control signaling indicating a first power control configuration for a transmission time interval configured by both a neighbor base station and the serving base station for uplink transmission in a same frequency band, and a second power control configuration corresponding to the neighbor base station configuring the transmission time interval at least partially for downlink transmission and the serving base station configuring the transmission time interval at least partially for uplink transmission in the same frequency band; and
receiving an uplink message in accordance with one of the first power control configuration or the second power control configuration based at least in part on a first transmission time interval format of the serving base station and a second transmission time interval format of the neighbor base station corresponding to a first transmission time interval, wherein the uplink message is received during the first transmission time interval.

14. The method of claim 13, wherein transmitting the control signaling comprises:
transmitting the control signaling indicating the first transmission time interval format, the second transmission time interval format, or both.

15. The method of claim 13, further comprising:
transmitting a grant scheduling transmission of the uplink message in the first transmission time interval, wherein the grant indicates one of the first power control configuration or the second power control configuration.

16. The method of claim 15, wherein receiving the grant comprises:
transmitting the grant comprising a transmit power command indicating one of the first power control configuration or the second power control configuration.

17. The method of claim 16, wherein the transmit power command comprises one or more bits indicating one of the first power control configuration or the second power control configuration.

18. The method of claim 13, wherein transmitting the control signaling comprises transmitting control signaling indicating the first transmission time interval format.

19. The method of claim 18, wherein the control signaling indicating the first transmission time interval format identifies a path-loss exponent, a power offset value, a maximum power value, a maximum power reduction value, or any combination thereof.

20. The method of claim 13, wherein transmitting the control signaling comprises:
transmitting the control signaling indicating a configuration selection condition comprising a cell edge condition, a duplexing mode condition for the neighbor base station, a slot type condition, a beamforming condition, or any combination thereof.

21. The method of claim 13, further comprising:
transmitting a media access control element (MAC-CE) indicating one of the first power control configuration or the second power control configuration.

22. The method of claim 13, further comprising:
transmitting a grant scheduling transmission of the uplink message in the first transmission time interval.

23. The method of claim 13, wherein transmitting the control signaling comprises:
transmitting the control signaling indicating the first power control configuration that identifies a first initial transmission power for the uplink message that is a random access message and a first power ramp value, and the second power control configuration that identifies a second initial transmission power for the random access message and a second power ramp value.

24. The method of claim 23, further comprising:
transmitting a random access response message based at least in part on receiving the random access message; and
receiving a second random access message in accordance with the first power ramp value or the second power ramp value based at least in part on the transmitting.

25. An apparatus for wireless communication by a user equipment (UE), comprising:
a processor;
memory coupled with the processor; and
instructions stored in the memory and executable by the processor to cause the apparatus to:
receive control signaling indicating a first power control configuration for a transmission time interval configured by both a neighbor base station and a serving base station of the UE for uplink transmission in a same frequency band, and a second power control configuration corresponding to the neighbor base station configuring the transmission time interval at least partially for downlink transmission and the serving base station configuring the transmission time interval at least partially for uplink transmission in the same frequency band;
select one of the first power control configuration or the second power control configuration based at least in part on a first transmission time interval format of the serving base station and a second transmission time interval format of the neighbor base station corresponding to a first transmission time interval for transmission of an uplink message; and
transmit the uplink message during the first transmission time interval in accordance with the selected power control configuration.

26. The apparatus of claim 25, further comprising a receiver, wherein the instructions to receive the control signaling are executable by the processor to cause the apparatus to:

receive, via the receiver, the control signaling indicating the first transmission time interval format, the second transmission time interval format, or both.

27. The apparatus of claim 25, wherein the instructions are further executable by the processor to cause the apparatus to:

receive a grant scheduling transmission of the uplink message in the first transmission time interval, wherein the grant indicates one of the first power control configuration or the second power control configuration.

28. An apparatus for wireless communication at a serving base station, comprising:

a processor;

memory coupled with the processor; and instructions stored in the memory and executable by the processor to cause the apparatus to:

transmit, to a user equipment (UE), control signaling indicating a first power control configuration for a transmission time interval configured by both a neighbor base station and the serving base station for uplink transmission in a same frequency band, and a second power control configuration corresponding to the neighbor base station configuring the transmission time interval at least partially for downlink transmission and the serving base station configuring the transmission time interval at least partially for uplink transmission in the same frequency band; and receive an uplink message in accordance with one of the first power control configuration or the second power control configuration based at least in part on a first transmission time interval format of the serving base station and a second transmission time interval format of the neighbor base station corresponding to a first transmission time interval, wherein the uplink message is received during the first transmission time interval.

29. The apparatus of claim 28, further comprising a transmitter, wherein the instructions to transmit the control signaling are executable by the processor to cause the apparatus to:

transmit, via the transmitter, the control signaling indicating the first transmission time interval format, the second transmission time interval format, or both.

30. The apparatus of claim 28, wherein the instructions are further executable by the processor to cause the apparatus to:

transmit a grant scheduling transmission of the uplink message in the first transmission time interval, wherein the grant indicates one of the first power control configuration or the second power control configuration.

* * * * *